(12) United States Patent
Takashima et al.

(10) Patent No.: US 6,347,372 B1
(45) Date of Patent: Feb. 12, 2002

(54) MULTIPROCESSOR CONTROL SYSTEM, AND A BOOT DEVICE AND A BOOT CONTROL DEVICE USED THEREIN

(75) Inventors: Tomonobu Takashima; Kaoru Chujo, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/271,332

(22) Filed: Mar. 18, 1999

(30) Foreign Application Priority Data

Mar. 20, 1998 (JP) .......................................... 10-072880

(51) Int. Cl.⁷ .............................................. G06F 9/445
(52) U.S. Cl. .......................................... 713/2; 709/222
(58) Field of Search ............................. 713/2; 709/220, 709/222; 710/104

(56) References Cited

U.S. PATENT DOCUMENTS

| | | | |
|---|---|---|---|
| 5,450,576 A | * 9/1995 | Kennedy | 713/2 |
| 5,794,031 A | * 8/1998 | Nakadai | 713/2 |
| 5,938,765 A | * 8/1999 | Dove et al. | 713/2 X |
| 6,009,521 A | * 12/1999 | Huang | 713/2 X |
| 6,012,142 A | * 1/2000 | Dokic et al. | 713/2 |
| 6,058,475 A | * 5/2000 | McDonald et al. | 713/2 |
| 6,122,735 A | * 9/2000 | Steiert et al. | 713/2 |
| 6,138,234 A | * 10/2000 | Lee et al. | 713/2 |
| 6,158,000 A | * 12/2000 | Collins | 713/2 X |

FOREIGN PATENT DOCUMENTS

JP          64-15858          1/1989

* cited by examiner

*Primary Examiner*—Thomas M. Heckler
(74) *Attorney, Agent, or Firm*—Staas & Halsey LLP

(57) ABSTRACT

A multiprocessor control system includes a plurality of processors, a boot control device controlling boot of the plurality of processors, a storage device storing boot data therein, and a shared bus interconnecting the plurality of processors, the boot control device and the storage device. The processors constitute at least one boot processor to which the boot data is to be loaded. The boot control device includes a time slot division unit which produces time slots on the shared bus by multiplexing channels for the processors, and a time sharing control unit which determines a time slot for the boot processor among the time slots produced, and assigns the time slot to the boot processor. The time sharing control unit includes a processor interface part which notifies a time-slot location of the time slot determined, to the boot processor. A bus time-slot setting part notifies the time-slot location to the storage device, allowing reading of the boot data from the storage device and inserting of the boot data into the time slot at the time-slot location among the time slots on the shared bus, so that the boot data is loaded into the boot processor via the shared bus.

29 Claims, 42 Drawing Sheets

FIG. 5

| ITEM | DESCRIPTOR | | CONTENT |
|---|---|---|---|
| PROCESSOR DESCRIPTION | d3~d2 | 0 0 | CLOCK:50MHz<br>INTERNAL MEMORY:12k |
| | | 0 1 | CLOCK:66MHz<br>INTERNAL MEMORY:16k |
| | | 1 0 | CLOCK:75MHz<br>INTERNAL MEMORY:20k |
| | | 1 1 | Reserved |
| ACCESS SPEED | d1~d0 | 0 0 | 1 CYCLE |
| | | 0 1 | 2 CYCLE |
| | | 1 0 | 4 CYCLE |
| | | 1 1 | 8 CYCLE |

FIG. 6

| | DESCRIPTOR | STATUS (d11~d08) | PARAMETER (d07~d04) | RESULT (d03~d00) |
|---|---|---|---|---|
| 1. | BOOT REQUEST STATUS | 0000 | don't care | don't care |
| 2. | PROCESSOR DESCRIPTION | 0001 | [d7-d8:PROC TYPE]<br>00:clk 50M/12k<br>10:clk 60M/16k<br>01:clk 75M/20k<br>11:reserved<br>[d5-d4:MEMORY WAIT]<br>00:1cycle<br>10:2cycle<br>01:4cycle<br>11:8cycle | don't care |
| 3. | BOOT REQUEST APPLICATION TYPE | 0010 | don't care | don't care |
| 4. | BOOT DATA LENGTH | 0011 | don't care | don't care |
| 5. | BOOT SPEED | 0100 | don't care | don't care |
| 6. | BOOT COMPLETION | 0101 | 0000:BLOCK0<br>:<br>1111:BLOCK15 | 0:NORMAL<br>1:ERROR |
| 7. | BLOCK TRANSMISSION RESULT | 0110 | | |

FIG. 8

| No | PROC#1 | PROC#2 | PROC#3 | ・・・ | PROC#N | |
|---|---|---|---|---|---|---|
| 1 | inact | inact | inact | | inact | |
| 2 | act | inact | inact | | inact | |
| 3 | inact | act | inact | | inact | |
| 4 | act | act | inact | | inact | |
| | | | | | | |
| 2^N | | | | | | |

FIG. 36
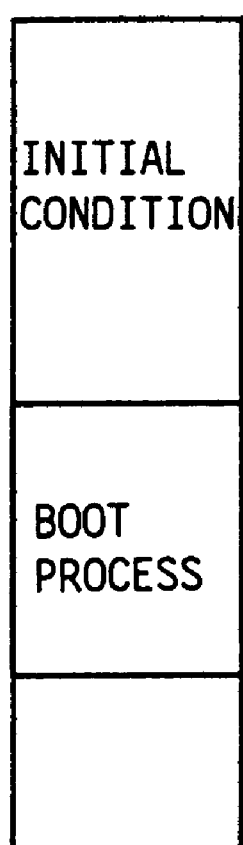
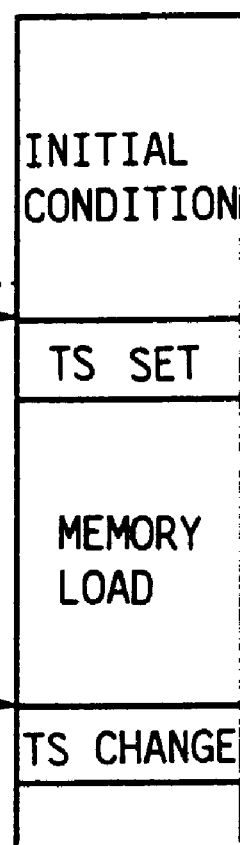

MULTIPROCESSOR CONTROL SYSTEM, AND A BOOT DEVICE AND A BOOT CONTROL DEVICE USED THEREIN

BACKGROUND OF THE INVENTION (1) Field of the Invention

The present invention relates to a multiprocessor control system, and a boot device and a boot control device used in the multiprocessor control system, the multiprocessor control system including a plurality of processors on a board.

(2) Description of the Related Art

A multiprocessor control system in which a plurality of processors are provided on a board is known. With recent development of device and architecture technology, processors have advanced in speed and integration. Systems and devices utilizing processors now require an increase of processing speed, advanced functions, an increase of the number of multiplexed channels and an increase of application programs used.

Basically, a multiprocessor control system includes a plurality of processors, and the processors have application programs necessary for their operation. The application programs are retained in an external storage, such as a floppy disk, a read-only memory, a communication board or the like. To boot one of the processors, the application program for the processor is read from the external storage and loaded to the processor.

FIG. 1 shows a conventional multiprocessor control system. In the conventional multiprocessor control system of FIG. 1, a processor (PROCESSOR#1) 1, a processor (PROCESSOR#2) 2, . . . , and a processor (PROCESSOR#N) 3 (where N is an integer) are provided, and a plurality of buses 7, 8, 9 are individually provided for the processors 1, 2, 3. The processors 1, 2, 3 require a plurality of memories 4, 5, 6 in which application programs necessary for the operation of the processors 1, 2, 3 are stored therein. The processors 1, 2, 3 require a plurality of control devices 10, 11, 12 which control boot of the processors 1, 2, 3, respectively. The bus 7 interconnects the processor 1 and the memory 4, the bus 8 interconnects the processor 2 and the memory 5, and the bus 9 interconnects the processor 3 and the memory 6.

FIG. 2 shows another conventional multiprocessor control system. In the conventional multiprocessor control system of FIG. 2, a processor (PROCESSOR#1) 1, a processor (PROCESSOR#2) 2, . . . , and a processor (PROCESSOR#N) 3, a plurality of memories 4, 5, 6, a bus arbiter 27, and shared buses 28 and 29 are provided. The memories 4, 5, 6 store application programs (which will be called boot data) necessary for the operation of the processors 1, 2, 3, respectively. The shared buses 28 and 29 interconnect the processors 1, 2, 3, the memories 4, 5, 6, and the bus arbiter 27.

The bus arbiter 27 controls bus access of the processors 1, 2, 3 to the shared buses 28 and 29 by determining which processor can actively use the shared buses 28 and 29. When a bus use factor occurs in one of the processors 1, 2, 3, the processor of concern outputs a request to the bus arbiter 27. When the buses 28 and 29 can be used, the bus arbiter 27 sends an acknowledge to the processor of concern. The processor of concern receives the acknowledge, and is able to access the buses 28 and 29. The boot data (the application program necessary for the operation of the processor) is read from one of the memories 4, 5, 6 by using the busses 28 and 29, and loaded to the processor of concern.

FIG. 3 shows a bus access processing of the multiprocessor control system of FIG. 2. As shown in FIG. 3, when a bus use factor (18) occurs in the processor (PROCESSOR#1) 1, the processor 1 outputs a request to the bus arbiter 27 (S0). When the buses 28 and 29 are currently not used by the other processors, the bus arbiter 27 sends an acknowledge to the processor 1 (S1). The processor 1 receives the acknowledge, and obtains the ability to access the buses 28 and 29. The boot data is read from the memory 4 by using the buses 28 and 29, and loaded to the processor 1 (20). After the bus access is complete, the processor 1 outputs an access complete to the bus arbiter 27 (S2). The processor 1 requires a waiting time (19) after the output of the request to the bus arbiter 27 and before the receipt of the acknowledge from the bus arbiter 27.

When a bus use factor (24) occurs in the processor (PROCESSOR#2) 2, the processor 2 outputs a request to the bus arbiter 27 (S3). When the buses 28 and 29 are currently not used by another processor, the bus arbiter 27 sends an acknowledge to the processor 2 (S5). The processor 2 receives the acknowledge, and obtains the ability to access the buses 28 and 29. The boot data is read from the memory 5 by using the buses 28 and 29, and loaded to the processor 2 (26). After the bus access is complete, the processor 2 outputs an access complete to the bus arbiter 27 (S6). In the meantime, after the output of the request by the processor 2, the processor 1 outputs a request to the bus arbiter 27 (S4). As the buses 28 and 29 are used by the processor 2, the bus arbiter 27 does not send an acknowledge to the processor 1 until the bus access by the processor 2 is complete. In this case, the processor 1 requires a longer waiting time (22) after the output of the request to the bus arbiter 27 and before the receipt of the acknowledge from the bus arbiter 27. After the bus complete from the processor 2 is received (S6), the bus arbiter 27 sends an acknowledge to the processor 1 (S7). The processor 1 receives the acknowledge, and obtains the ability to access the buses 28 and 29 (23).

In the conventional multiprocessor control system of FIG. 2, the bus arbiter 27 sends an acknowledge to the processor of concern when the buses 28 and 29 are not used by another processor. However, when the buses 28 and 29 are used by another processor, the bus arbiter 27 does not send an acknowledge to the processor of concern. The processor of concern is held in a waiting condition until the bus access by the other processor is complete and an acknowledge from the bus arbiter 27 is received. The waiting time in the latter case is longer than the waiting time in the former case. In a certain case, the processor which outputs a secondary request after the output of the request by another processor, has to perform an abort process to cancel the bus access.

In addition, in the above-described multiprocessor control system, the processors must output a request to the bus arbiter 27 (S0, S3 or S4) and receive an acknowledge from the bus arbiter 27 (S1, S5 or S7) in order to start the bus access. In a case of the multiprocessor control system including a large number of processors, the overhead of the processors when starting the bus access is considerably increased, and the congestion of the bus access between the processors is likely to occur. In a case of the multiprocessor control system having a swap function of the application programs, the time to boot one of the processors and start the application program for the processor is considerably increased as the number of the processors increases. Accordingly, it is desirable to provide a multiprocessor control system which can reduce the time to boot one of the processors by using a simple circuit structure.

SUMMARY OF THE INVENTION

An object of the present invention is to provide an improved multiprocessor control system in which the above-mentioned problems are eliminated.

Another object of the present invention is to provide a multiprocessor control system which can speedily boot one of the processors by using a simple, scale-down configuration, and shorten the overall starting time of the application program for the processor.

Still another object of the present invention is to provide a boot control device which can speedily boot one of the processors by using a simple, scale-down configuration, and shorten the overall starting time of the application program for the processor.

A further object of the present invention is to provide a boot device which can speedily boot one of the processors by using a simple, scale-down configuration, and shorten the overall starting time of the application program for the processor.

The above-mentioned objects of the present invention are achieved by a multiprocessor control system including a plurality of processors, a boot control device controlling boot of the plurality of processors, a storage device storing boot data therein, and a shared bus interconnecting the plurality of processors, the boot control device and the storage device, the plurality of processors constituting at least one boot processor to which the boot data is to be loaded, the boot control device including: a time slot division unit which produces time slots on the shared bus by multiplexing channels for the plurality of processors; and a time sharing control unit which determines a time slot for the boot processor among the time slots produced by the time slot division unit, and assigns the time slot to the boot processor, the time sharing control unit comprising: a processor interface part which notifies a time-slot location of the time slot determined by the time sharing control unit, to the boot processor; and a bus time-slot setting part which notifies the time-slot location to the storage device, the bus time-slot setting part allowing reading of the boot data from the storage device and inserting of the boot data into the time slot at the time-slot location among the time slots on the shared bus, so that the boot data is loaded into the boot processor via the shared bus.

The above-mentioned objects of the present invention are achieved by a boot control device which controls boot of a plurality of processors connected to a shared bus, the plurality of processors constituting at least one boot processor to which boot data is to be loaded, including: a time slot division unit which produces time slots on the shared bus by multiplexing channels for the plurality of processors; and a time sharing control unit which determines a time slot for the boot processor among the time slots produced by the time slot division unit, and assigns the time slot to the boot processor, the time sharing control unit comprising: a processor interface part which notifies a time-slot location of the time slot determined by the time sharing control unit, to the boot processor; and a bus time-slot setting part which notifies the time-slot location to the storage device, the bus time-slot setting part allowing reading of the boot data from the storage device and inserting of the boot data into the time slot at the time-slot location among the time slots on the shared bus, so that the boot data is loaded into the boot processor via the shared bus.

The above-mentioned objects of the present invention are achieved by a boot device including a board on which a plurality of processors, a boot control device controlling boot of the processors, a storage device storing boot data, and a shared bus interconnecting the plurality of processors, the boot control device and the storage device, are installed, the plurality of processors constituting at least one boot processor to which the boot data is to be loaded, the boot control device including: a time slot division unit which produces time slots on the shared bus by multiplexing channels for the plurality of processors; and a time sharing control unit which determines a time slot for the boot processor among the time slots produced by the time slot division unit, and assigns the time slot to the boot processor, the time sharing control unit comprising: a processor interface part which notifies a time-slot location of the time slot determined by the time sharing control unit, to the boot processor; and a bus time-slot setting part which notifies the time-slot location to the storage device, the bus time-slot setting part allowing reading of the boot data from the storage device and inserting of the boot data into the time slot at the time-slot location among the time slots on the shared bus, so that the boot data is loaded into the boot processor via the shared bus.

In the multiprocessor control system of a preferred embodiment of the present invention, the boot control device includes the time sharing control unit which determines a time slot for the boot processor among the time slots produced by the time slot division unit, and assigns the time slot to the boot processor, and the time sharing control unit includes the bus time-slot setting part which notifies the time-slot location to the storage device, the bus time-slot setting part allowing reading of the boot data from the storage device and inserting of the boot data into the time slot at the time-slot location among the time slots on the shared bus, so that the boot data is loaded into the boot processor via the shared bus. The boot control device according to the present invention provides an integrated boot control of the plurality of processors by using the shared bus and provides a simple, scale-down circuit structure on the periphery of the plurality of processors. The boot control device of the present invention is effective in speedily booting one of the processors by using a simple, scale-down configuration, and effective in shortening the overall starting time of the application program for the processor of concern.

The boot device of a preferred embodiment of the present invention can speedily boot one of the processors by using a simple, scale-down configuration, and can shorten the overall starting time of the application program for the processor of concern. In the boot device of the present invention, the plurality of processors, the boot control device, the storage device and the shared bus are installed on the board. The boot device of the present invention is effective in using a simple, scale-down circuit structure.

BRIEF DESCRIPTION OF THE DRAWINGS

Other objects, features and advantages of the present invention will become more apparent from the following detailed description when read in conjunction with the accompanying drawings in which:

FIG. 5 is a diagram of an example of a reporting parameter transmitted from a plurality of processors to a boot control device;

FIG. 6 is a diagram of an example of a processor status of processors detected by the boot control device;

FIG. 8 is a diagram of an example of a first table;

FIG. 36 is a diagram for explaining a sequence of the multiprocessor control system of FIG. 35;

DETAILED DESCRIPTION OF THE PREFERRED EMBODIMENTS

A description will now be given of the principles of a multiprocessor control system of the present invention with reference to the accompanying drawings.

Figure 1:
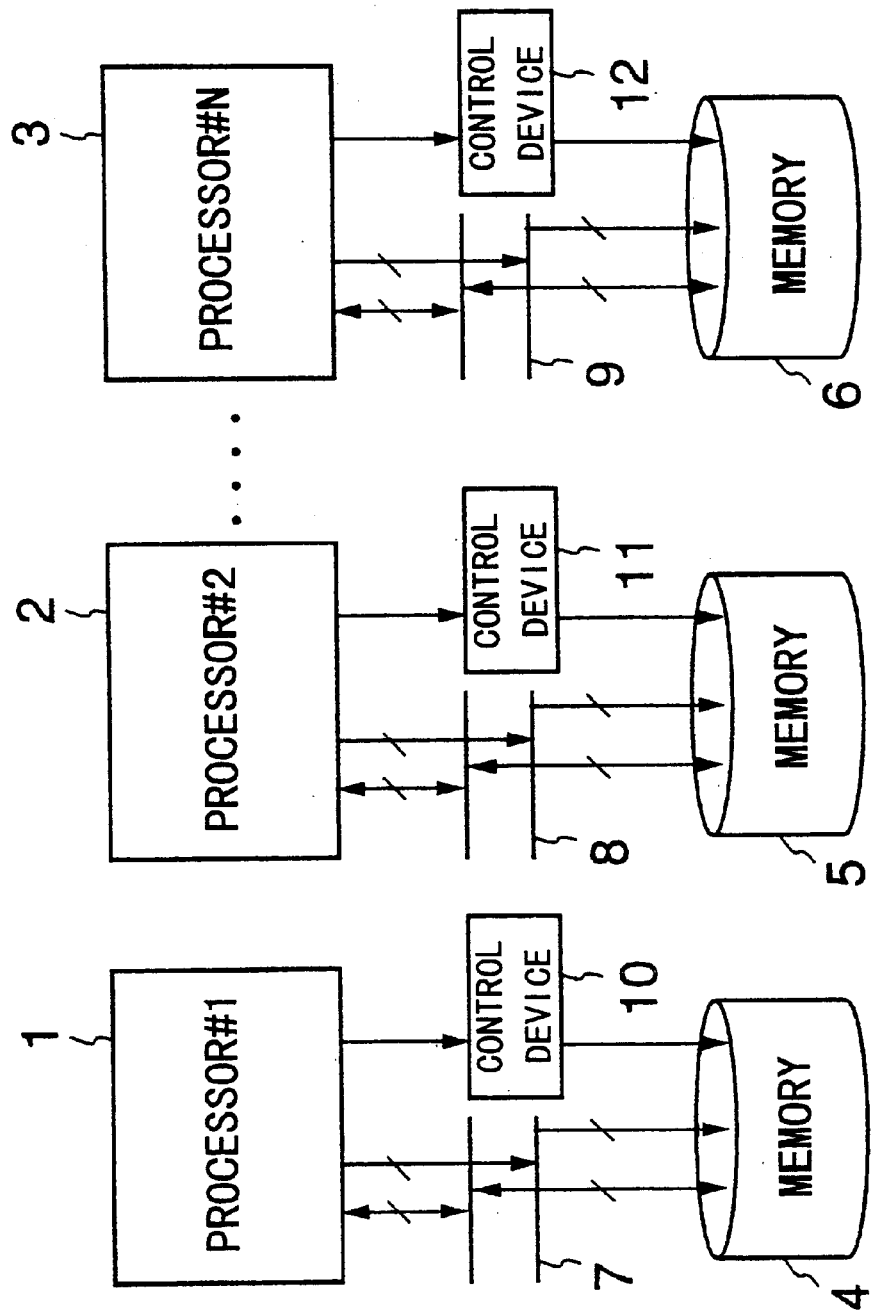
FIG. 1 is a block diagram of a conventional multiprocessor control system.
Figure 2:
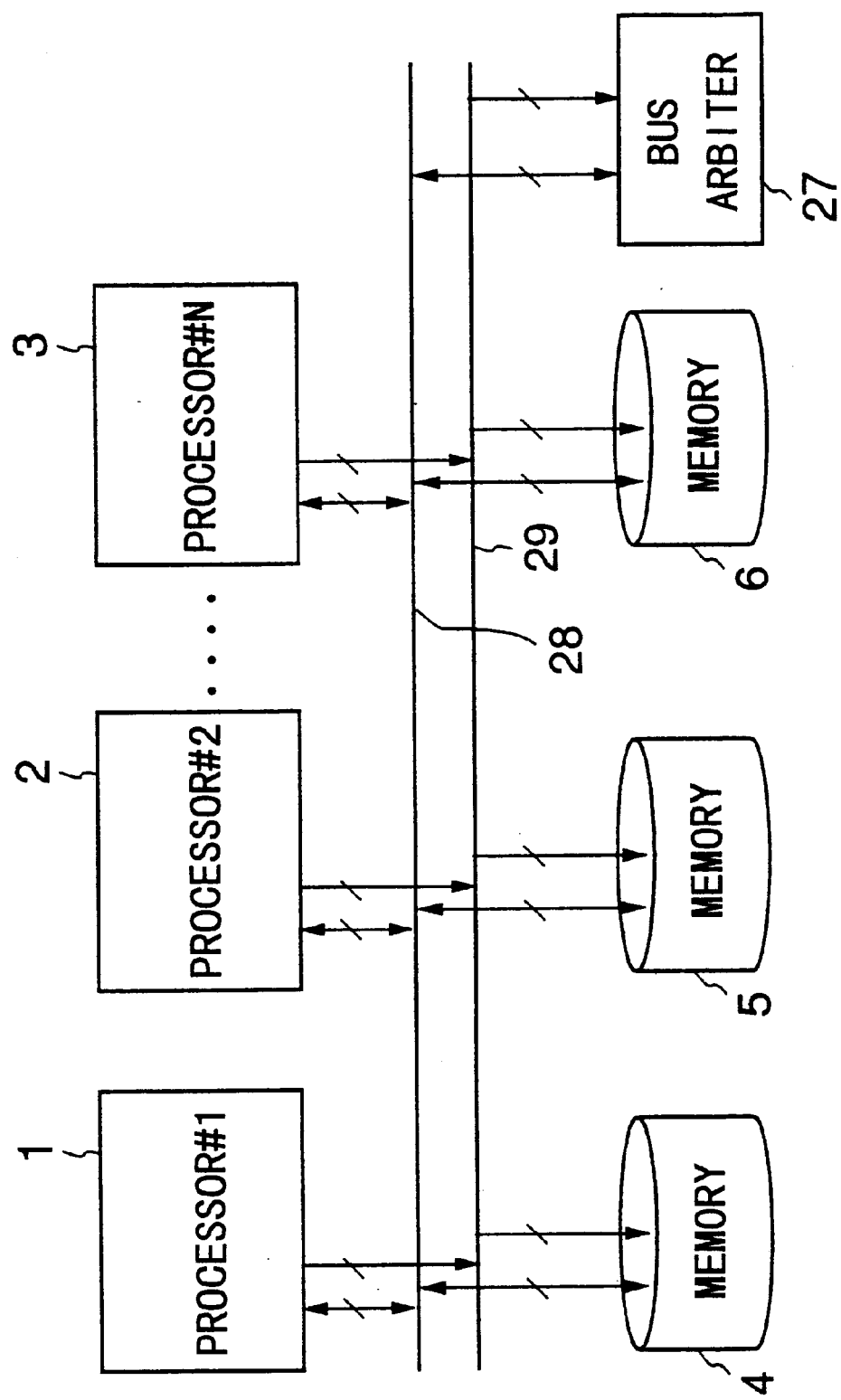
FIG. 2 is a block diagram of another conventional multiprocessor control system.
Figure 3:
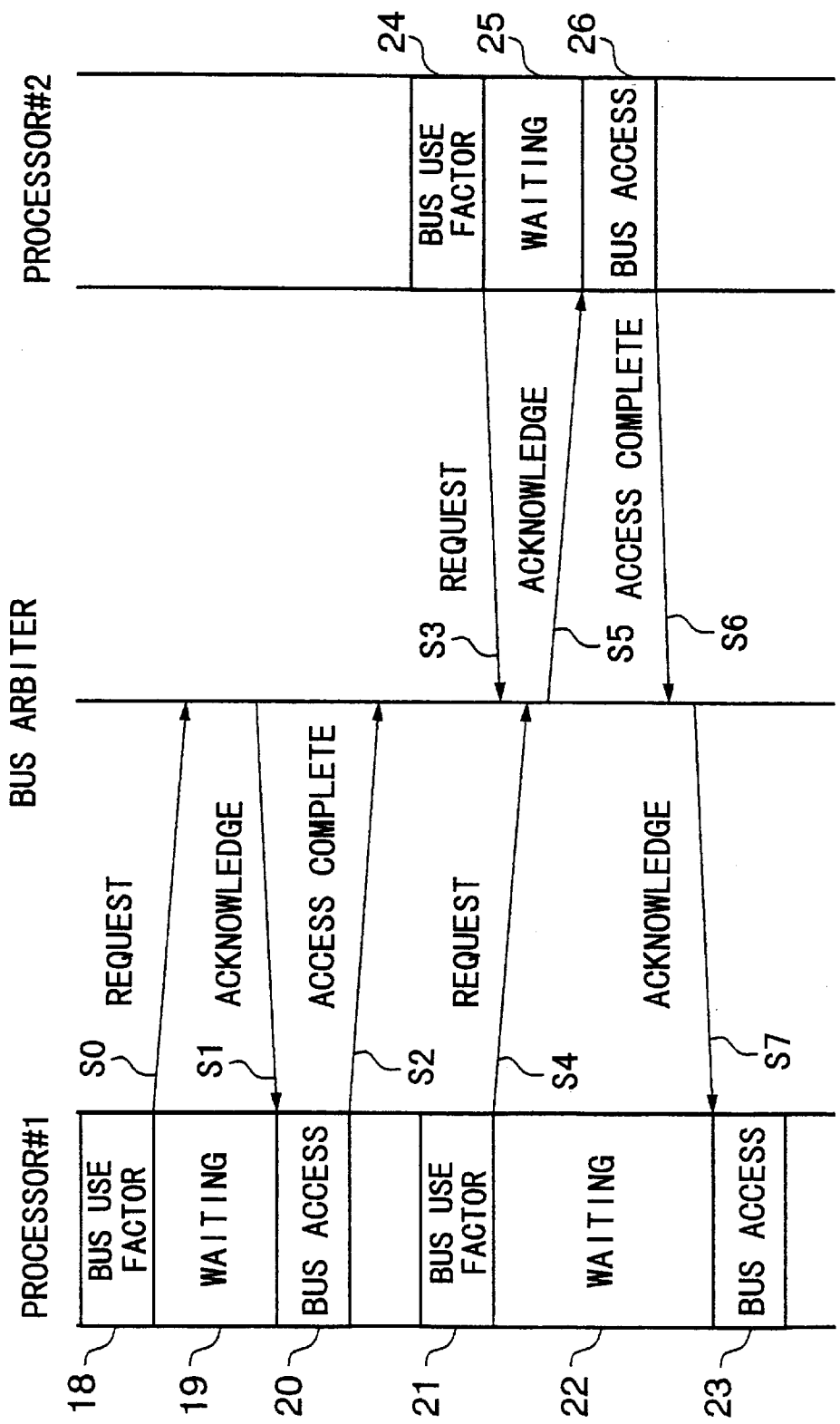
FIG. 3 is a diagram for explaining a bus access processing of the multiprocessor control system of FIG. 2.
Figure 4:
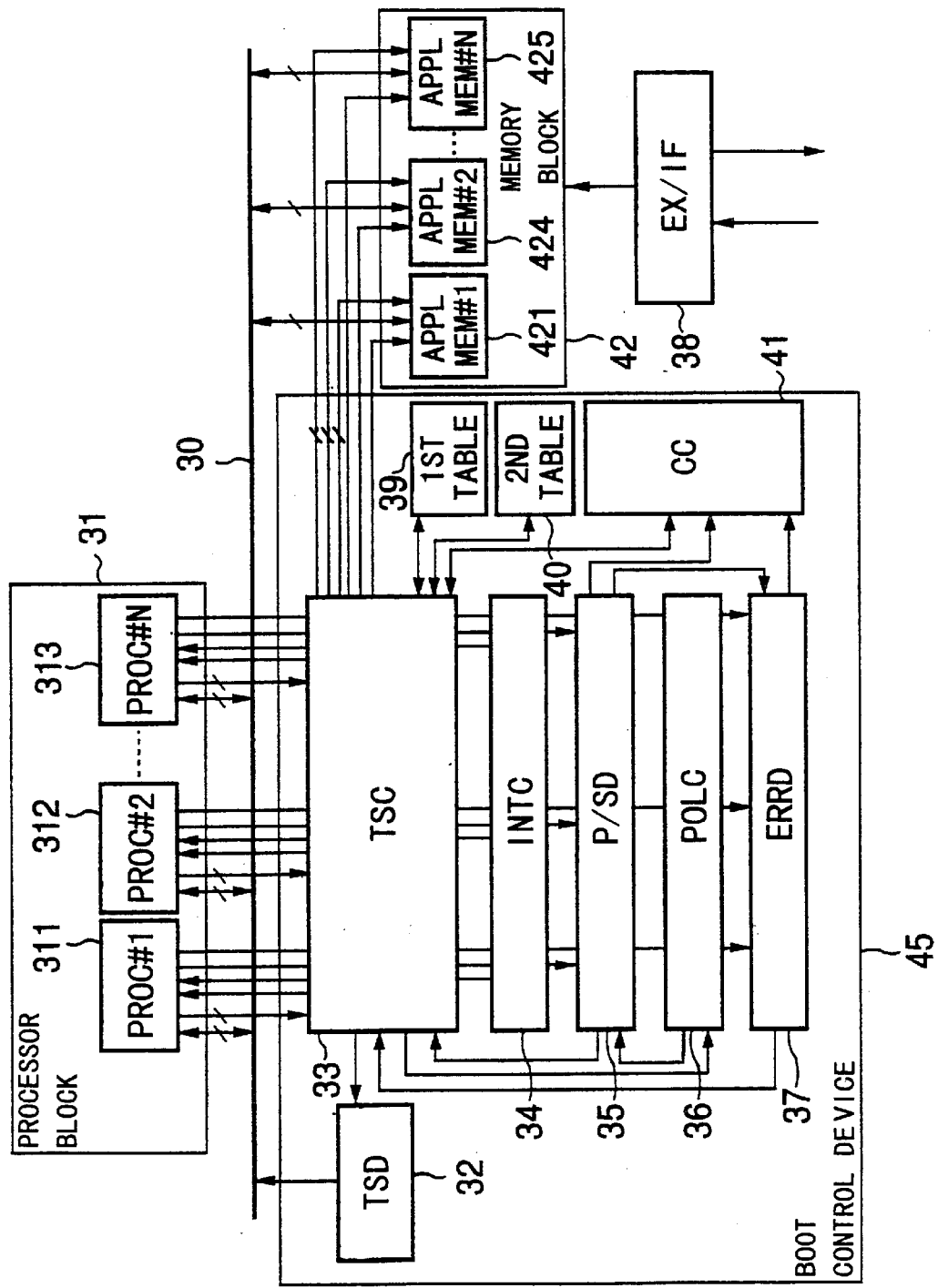
FIG. 4 is a block diagram of a multiprocessor control system embodying the present invention.

FIG. 4 shows a multiprocessor control system embodying the present invention.

As shown in FIG. 4, the multiprocessor control system includes a processor block 31, a boot control device 45, a memory block 42, and a shared bus 30. The processors of the processor block 31, the boot control device 45 and the memories of the memory block 42 are interconnected by the shared bus 30.

The processor block 31 includes a processor 311 (PROC#1), a processor 312 (PROC#2), . . . , a processor 313 (PROC#N) where N is an integer. These processors 311–313 will be called the "N" processors. The boot control device 45 controls boot of the "N" processors. The memory block 42 is a storage device which stores a plurality of application programs therein. The memory block 42 is divided into an application program memory 421 (APPL MEM#1), an application program memory 424 (APPL MEM#2), . . . , an application program memory 425 (APPL MEM#N). The plurality of application programs include boot data for the respective processors of the processor block 31.

The boot control device 45 includes a time slot division unit (TSD) 32, a time sharing control unit (TSC) 33, an interrupt control unit (INTC) 34, a processor-status detection unit (P/SD) 35, a polling control unit (POLC) 36, an error detection (ERRD) 37, a first table 39, a second table 40, and a channel control unit (CC) 41. An external port interface unit (EX/IF) 38 is connected to the memory block 42.

The "N" processors in the processor block 31 include at least one boot processor to which the boot data is to be loaded. In accordance with a timing signal and a control signal from the TSD 32 and the TSC 33, the boot data read from the storage device 42 is loaded into the boot processor among the "N" processors.

The time slot division unit (TSD) 32 produces time slots, delivered on the shared bus 30, by multiplexing channels for the "N" processors of the processor block 31 based on a timing signal output by the TSC 33.

The time sharing control unit (TSC) 33 is a central control circuit of the boot control device 45, and it provides commands, timing signals and/or control signals to the TSD 32, the INTC 34, the P/SD 35, the POLC 36, the ERRD 37, the first table 39, the second table 40, the CC 41 and the storage device 42. The TSC 33 receives boot active/inactive status data of the "N" processors, error status data of the "N" processors, and access speed data of the "N" processors, in order to control boot of the "N" processors. The TSC 33 determines a time slot for the boot processor among the time slots produced by the TSD 32, and assigns the time slot to the boot processor. The TSC 33 notifies the time slot to the boot processor, reads the boot data from the storage device 42, and inserts the boot data into the time slot at a time-slot location among the time slots on the shared bus 30, so that the boot data is loaded into the boot processor. The multi-processor control system of the present invention executes the boot process for the boot processor in this manner.

The interrupt control unit (INTC) 34 controls interrupt of the "N" processors of the processor block 31, and sends an interrupt to the boot processor so as to enable the boot of the boot processor or notify a boot start timing to the boot processor.

The processor-status detection unit (P/SD) 35 detects processor-status data of the "N" processors of the processor block 31 by performing polling of the "N" processors in accordance with a polling timing signal from the polling control unit (POLC) 36. An example of the processor status detected by the P/SD 35 of the boot control device 45 is shown in FIG. 6. As shown in FIG. 6, the processor status data of the "N" processors detected by the P/SD 35 is one of (1) boot request status, (2) processor description, (3) boot request application type, (4) boot data length, (5) boot speed, (6) boot completion, and (7) block transmission result.

The polling control unit (POLC) 36 receives a polling period signal from the TSC 33 and transmits the polling timing signal to the P/SD 35.

The error detection unit (ERRD) 37 detects whether an error occurs in the processor-status data output by the "N" processors of the processor block 31.

The external port interface unit (EX/IF) 38 sends an external signal to the storage device 42 in order to update the information stored in the storage device 42.

The first table 39 is accessed by the TSC 33 when the boot speeds of the "N" processors of the processor block 31, installed on a board, are the same as each other. In the first table 39, predetermined boot-active/inactive status of each of the "N" processors is stored. The TSC 33 assigns the time slot to the boot processor in accordance with the predetermined boot-active/inactive status of the boot processor read from the first table 39. FIG. 8 shows an example of the first table 39.

The second table 40 is accessed by the TSC 33 when the boot speeds of the "N" processors of the processor block 31, installed on the board, are different from each other. In the second table 40, a predetermined boot speed and a predetermined boot-active/inactive status of each of the "N" processors is stored. The TSC 33 assigns the time slot to the boot processor in accordance with the predetermined boot speed and the predetermined boot-active/inactive status of the boot processor read from the second table 40.

The channel control unit (CC) 41 acts to designate an application program for one of the "N" processors of the processor block 31. The CC 41 receives the processor status data from the P/SD 35 and receives the error data from the ERRD 37. When an error occurs in one of the "N" processors of the processor block 31, the CC 41 notifies the TSC 33 that the TSC 33 should avoid the assignment of the time slot to the defective processor. The CC 41 causes the TSC 33 to notify a host system, which manages the processor of concern, that the channel for the processor of concern is defective, or that the channel for the processor of concern should be set in an OFF status.

The memory block 42 is a storage device which stores the plurality of application programs for the respective processors of the processor block 31 mounted on the board. The plurality of application programs include the boot data for the respective processors of the processor block 31. The storage device 42 may be a hard disk drive, a floppy disk drive, or the like, which depends on the type of service of the board on which the "N" processors are installed. It is possible to update the information stored in the storage device 42 by transmitting an external signal to the storage device 42 via the EX/IF 38. When plural application programs are stored in a storage device, the storage device may be divided into a number of banks and the application programs may be respectively stored in the banks. Alternatively, a plurality of memory devices may be used to store the application programs.

Next, a description will be given of operations of the multiprocessor control system of FIG. 4.

Suppose that the processor block 31 includes "N" digital signal processors #1 through #N (where N is an integer) which carry out coding and decoding of a voice signal transmitted to or from an external private branch exchange, the processors #1 through #K (where K is an integer) of the "N" processors constituting at least one boot processor to which an LD-CELP (low-delay code-excited linear prediction) voice coding and decoding application program is to be loaded, and the processors #K+1 through #N of the "N" processors constituting at least one boot processor to which a CS-ACELP (conjugate structure algebraic code-excited linear prediction) voice coding and decoding application program is to be loaded.

In the multiprocessor control system of FIG. 4, the channel/application type of each of the "N" processors is transmitted from the CC 41 to the TSC 33. The TSC 33 transmits an initialize signal (or a reset signal) to each of the "N" processors of the processor block 31 via the shared bus 30. The "N" processors of the processor block 31 are initialized or reset by the signals transmitted by the TSC 33, and then transmit their reporting parameter and processor-status data to the TSC 33. The reporting parameter transmitted by each processor contains a processor description of the processor and an access speed of the processor. The processor-status data transmitted by each processor contains a boot complete/incomplete status of the processor.

FIG. 5 shows an example of the reporting parameter transmitted from the "N" processors to the boot control device 45. FIG. 6 shows an example of the processor status data of the "N" processors detected by the boot control device. In FIG. 6, for example, the processor description parameter "50 M/12 k" indicates that the processor operates on a 50 MHz clock and has a main memory of 12 K words.

Figure 7:
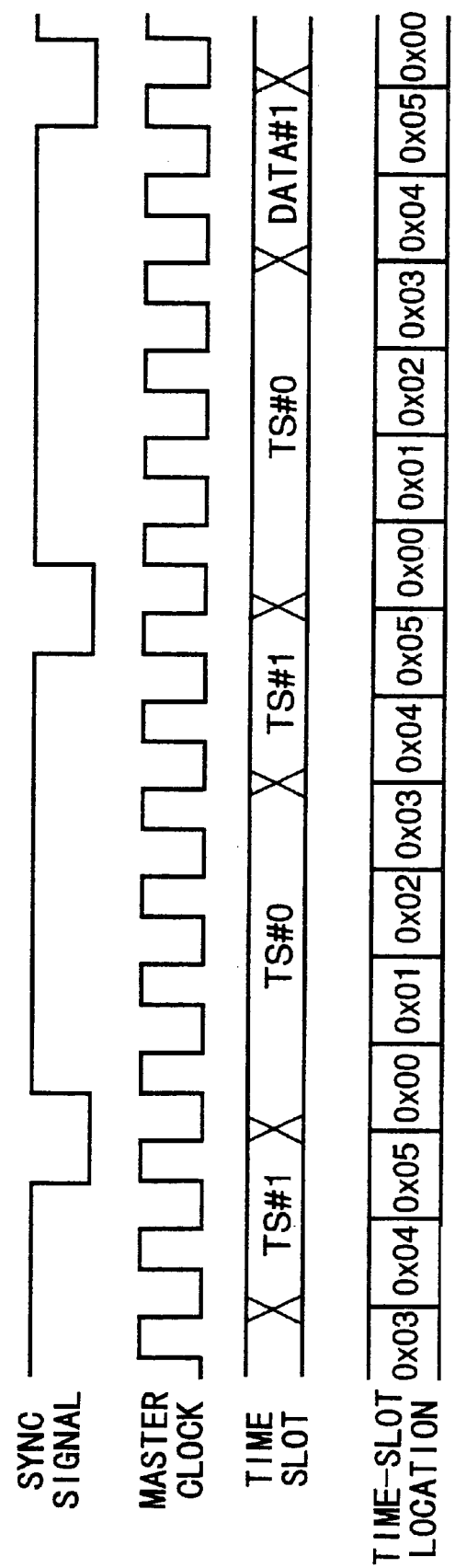
FIG. 7 is a time chart for explaining an operation of a time sharing control unit.

The TSC 33 performs time sharing control based on the processor description and the access speed of the reporting parameter transmitted by the "N" processors. FIG. 7 shows an operation of the time sharing control unit (TSC) 33 when the reporting parameter and the processor-status data transmitted by the processors #1 through #K are "0b000010" and "0b111100", and the reporting parameter and the processor-status data transmitted by the processors #K+1 through #N are "0b010001" and "0b111100". After a time-slot location for each of the "N" processors is determined by the TSC 33, the TSC 33 notifies the time-slot location to each of the "N" processors and the storage device 42. As shown in FIG. 7, a start time-slot location "0x00" and an end time-slot location "0x03" are notified to the processors #1 through #K and the storage device 42, and a start time-slot location "0x04" and an end time-slot location "0x05" are notified to the processors #K+1 through #N and the storage device 42.

Next, the TSC 33 notifies a boot start timing (or a boot start trigger) to each boot processor of the "N" processors. For example, the TSC 33 notifies a boot start timing to each boot processor of the "N" processors by either changing a value of a register in the boot processor, or sending an interrupt to the boot processor.

Figure 9:
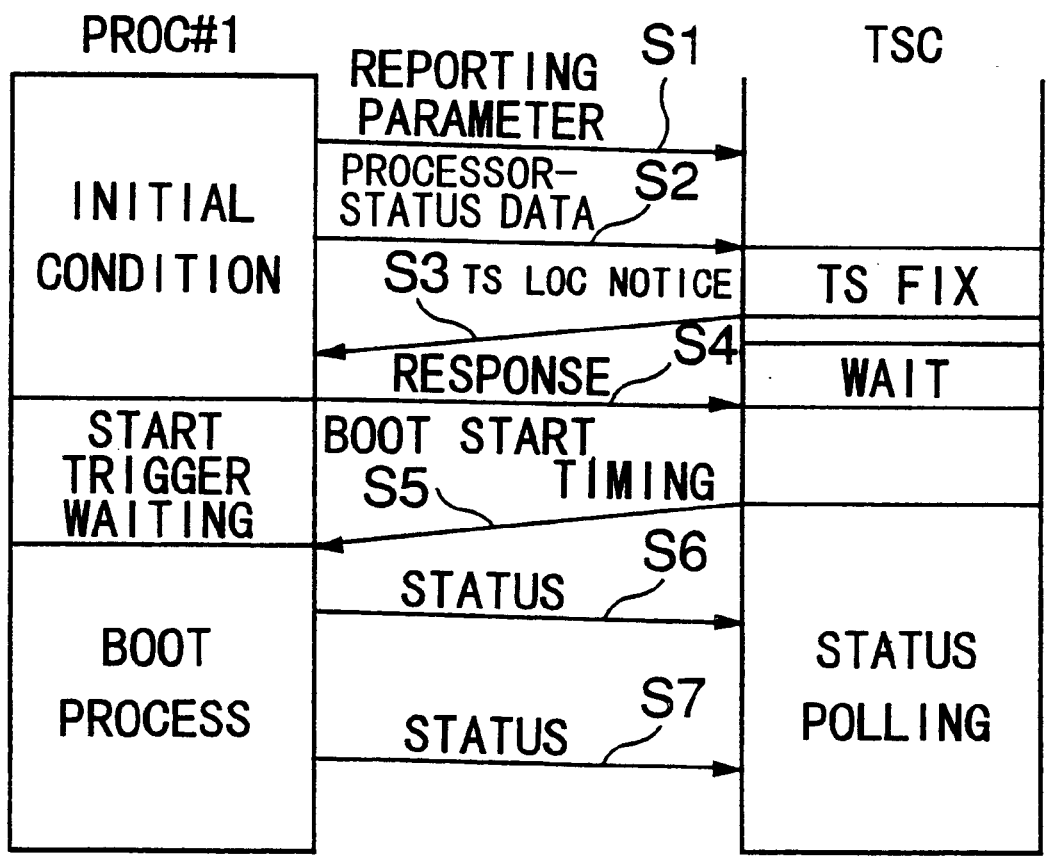
FIG. 9 is a diagram for explaining a sequence of the multiprocessor control system of FIG. 4 before and after a boot-start timing notification.
Figure 10:
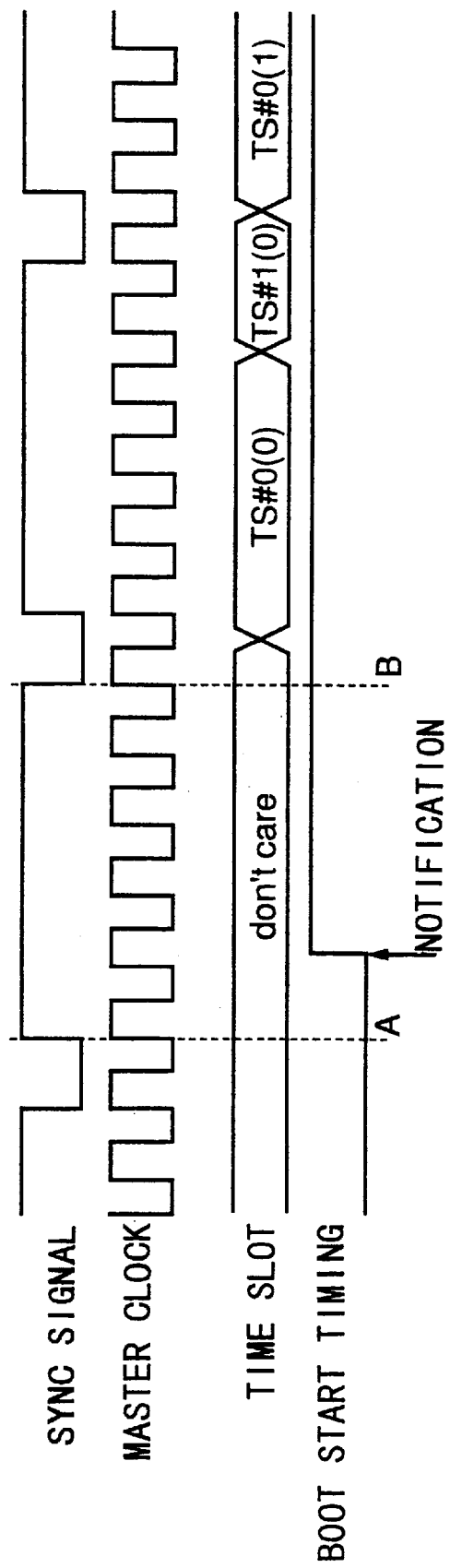
FIG. 10 is a time chart for explaining a boot-start timing notification performed by the time sharing control unit.

FIG. 9 shows a sequence of the multiprocessor control system of FIG. 4 before and after a boot-start timing notification. FIG. 10 shows a boot-start timing notification made by the TSC 33.

As shown in FIG. 9, at the start-up of the boot processor (for example, the processor 311), the boot processor transmits its reporting parameter to the TSC 33 (S1). The boot processor receives a polling signal from the TSC 33, and transmits its processor-status data to the TSC 33 (S2). The TSC 33 determines whether executing a boot process for the boot processor is required, based on the processor-status data. The TSC 33 determines a time slot for the boot processor among the time slots on the shared bus 30. The TSC 33 notifies a time-slot location of the time slot to the boot processor (S3). The boot processor transmits a response to the notification to the TSC 33 (S4). When the response from the boot processor is received, the TSC 33 notifies a boot start timing to the boot processor (S5). The boot process for the boot processor is started in accordance with the boot start timing. The TSC 33 periodically performs a polling of the "N" processors, and receives the processor-status data from the boot processor (S6, S7).

As shown in FIG. 10, the TSC 33 notifies a boot start timing to the boot processor at a rising edge (indicated by the arrow in FIG. 10) of a boot start timing signal. The boot process for the boot processor is started at a next time-slot location after the rising edge of the boot start timing signal. It is necessary that the rising edge of the boot start timing signal follows a time "A" (indicated in FIG. 10) a rising edge of a sync signal occurs. In a case in which the notification of a boot start timing is performed by sending an interrupt to the boot processor, it is necessary to maintain a certain period preceding a time "B" (indicated in FIG. 10) a next falling edge of the sync signal occurs, so as to suit an operation of an interrupt handler of the boot processor. To achieve this, the boot start timing signal in this example is generated by shifting the sync signal with the master clock on two or more stages.

The channel control unit (CC) 41 acts to designate an application type for each of the "N" processors. For example, the CC 41 designates an application A (the LD-CELP voice coding and decoding application program) for the processors #1 through #K, and designates an application B (the CS-ACELP voice coding and decoding application program) for the processors #K+1 through #N.

In the storage device 42, for example, the application A (the LD-CELP voice coding and decoding application program) for the processors #1 through #K is stored in the application program memory 421, and the application B (the CS-ACELP voice coding and decoding application program) for the processors #K+1 through #N is stored in the application program memory 424.

The CC 41 receives the processor status data from the P/SD 35 and receives the error data from the ERRD 37. When an error occurs in one of the "N" processors of the processor block 31, the CC 41 notifies the TSC 33 that the TSC 33 should avoid the assignment of the time slot to the processor in question. The CC 41 causes the TSC 33 to notify the host system that the channel for the processor of concern is defective, or that the channel for the processor of concern should be set in an OFF status.

When an error occurs in one of the "N" processors during the boot process or the normal operation, the CC 41 notifies a channel number of the defective processor to the TSC 33. The frequency of errors with respect to each of the channels of the "N" processors is recorded and retained. When the frequency of errors of the processor exceeds a reference value, the channel number and the error frequency of the processor are notified to the CC 41. The ERRD 37 detects whether an error occurs in the processor-status data output by the "N" processors of the processor block 31. For example, the ERRD 37 detects whether the block transmission result status (shown in FIG. 6) of the processor-status data is indicated by a normal value (0) or an error value (1).

A description will now be given of the preferred embodiments of the multiprocessor control system of the present invention with reference to the accompanying drawings. Only the elements of the boot control device which are related directly to the embodiment thereof are illustrated in the accompanying drawings. A duplicate description of other elements of the multiprocessor control system will be omitted for the sake of simplicity.

Figure 11:
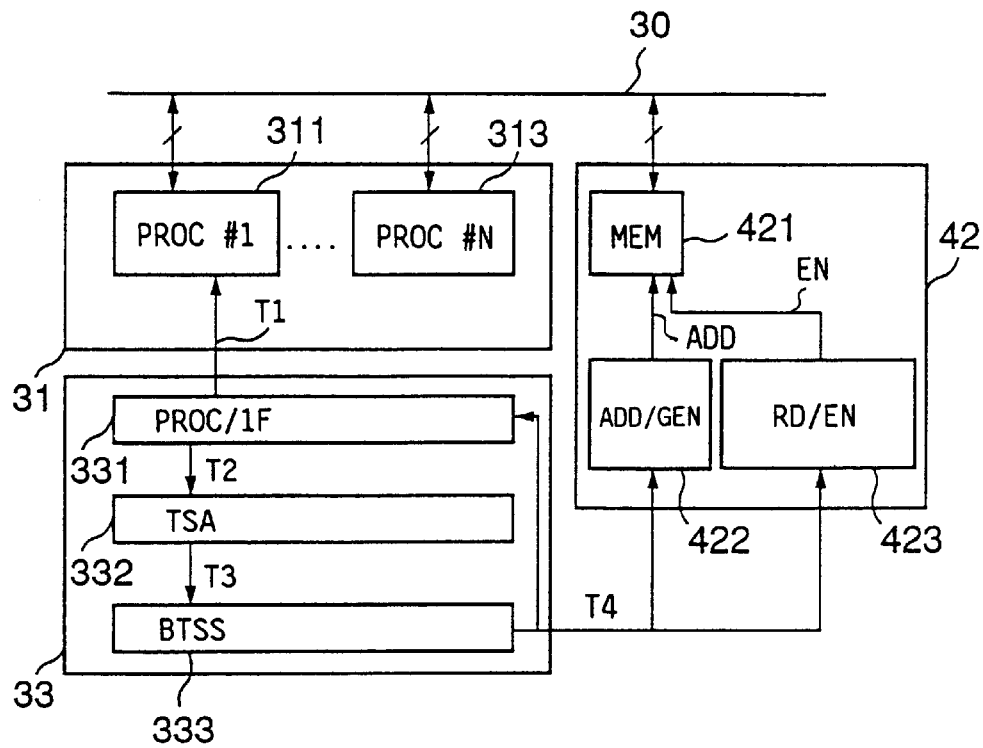
FIG. 11 is a block diagram of a first embodiment of the multiprocessor control system of the present invention.

FIG. 11 shows a first embodiment of the multiprocessor control system of the present invention. Boot control operations of the multiprocessor control system are illustrated. The present embodiment of the multiprocessor control system generally includes the processor block 31 (including the "N" processors 311, 313), the TSC 33 of the boot control device, the storage device 42 (including the application programs with the boot data), and the shared bus 30.

In the multiprocessor control system of FIG. 11, the processor block 31, including the "N" processors, the boot control device 45, the memory block 42, and the shared bus 30 are installed on a board. A boot device may be adapted for use in the present embodiment of the multiprocessor control system such that the board includes a plurality of connection terminals provided thereon in place of the "N" processors, the "N" processors being provided outside the board and respectively connected through the plurality of connection terminals to the shared bus 30.

In the following description, suppose that the processor (PROC#1) 311 among the "N" processors is a boot processor to which the boot data is to be loaded, and that the TSD 32 (FIG. 4) produces time slots on the shared bus 30 by multiplexing channels for the "N" processors based on the timing signal output by the time sharing control unit (TSC) 33.

As shown in FIG. 11, the TSC 33 includes a processor interface part (PROC/IF) 331 which provides an interface between the "N" processors and the TSC 33. The PROC/IF 331 notifies a time-slot location (determined by the TSC 33) to the boot processor (PROC#1) 311 as indicated by the arrow T1 in FIG. 11. The PROC/IF 331 outputs a boot processor parameter from the boot processor 311 to a time slot assigning part (TSA) 332 as indicated by the arrow T2 in FIG. 11. The TSA 332 assigns the time slots, produced by the TSD 32, to the individual processors of the processor block 31 by taking account of the number "N" of the processors, the bandwidth, and the table. The TSA 332 outputs the time slot total "N" and the bandwidth to a bus time-slot setting part (BTSS) 333 as indicated by the arrow T3. The BTSS 333 determines a time slot for the boot processor 311 among the time slots assigned by the TSA 332. The BTSS 333 notifies a time-slot location to both the PROC/IF 331 and the storage device 42 as indicated by the arrows T4 in FIG. 11.

For example, when a power switch (not shown) of the multiprocessor control system is turned ON, the TSC 33 determines that executing a boot process for the boot processor 311 is required. The boot process for the boot processor 311 is executed by the multiprocessor control system with the time slot assigned by the TSA 332 at the time-slot location notified by the BTSS 333.

Before performing the boot process, the TSC 33 notifies the time-slot location (the location in the time slot at which the boot data is to be inserted) to the boot processor 311, and the BTSS 333 notifies the time-slot location to the storage device 42. The storage device 42 includes an address generating part (ADD/GEN) 422 and a data read enable part (RD/EN) 423. The ADD/GEN 422 receives the signal output by the BTSS 333 and generates an address (ADD) of the memory 421 (where the boot data is stored). The RD/EN 423 receives the signal output by the BTSS 333 and outputs an enable signal (EN) to the memory 421 in response to the output signal of the BTSS 333. Hence, the boot data is read from the memory 421 in accordance with the address (ADD) and the enable signal (EN), and it is inserted into the time slot at the time-slot location among the time slots on the shared bus 30, so that the boot data is loaded into the boot processor 311 via the shared bus 30. In this manner, the multiprocessor control system of the present embodiment executes the boot process for the boot processor 311.

Figure 12:
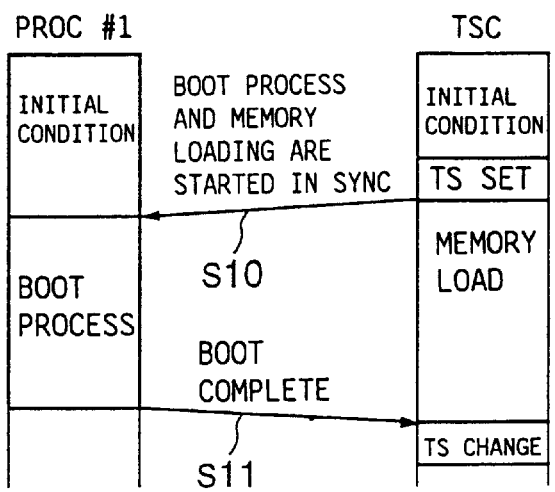
FIG. 12 is a diagram for explaining a sequence of the multiprocessor control system of FIG. 11.

FIG. 12 shows a sequence of the multiprocessor control system of FIG. 11.

As shown in FIG. 12, the sequence between the boot processor (PROC#1) 311 and the TSC 33 is carried out. When the TSC 33 determines that executing a boot process for the boot processor 311 is required, the TSC 33 determines a time slot for the boot processor 311 among the time slots produced by the TSD 32. A time-slot location of the time slot and a boot-start timing are notified to the boot processor 311 by the TSC 33 (S10). After the boot process is terminated, the boot processor 311 notifies the TSC 33 of the boot completion (S11). When the notification of the boot completion is received, the TSC 33 changes the time slot to start a next communication with the processor block 31. During a memory loading shown in FIG. 12, the generation of an address of the memory 421 is performed by the ADD/GEN 422 in synchronism with the shared bus 30, and the insertion of the read boot data into the time slot at the time-slot location is performed.

Figure 13:
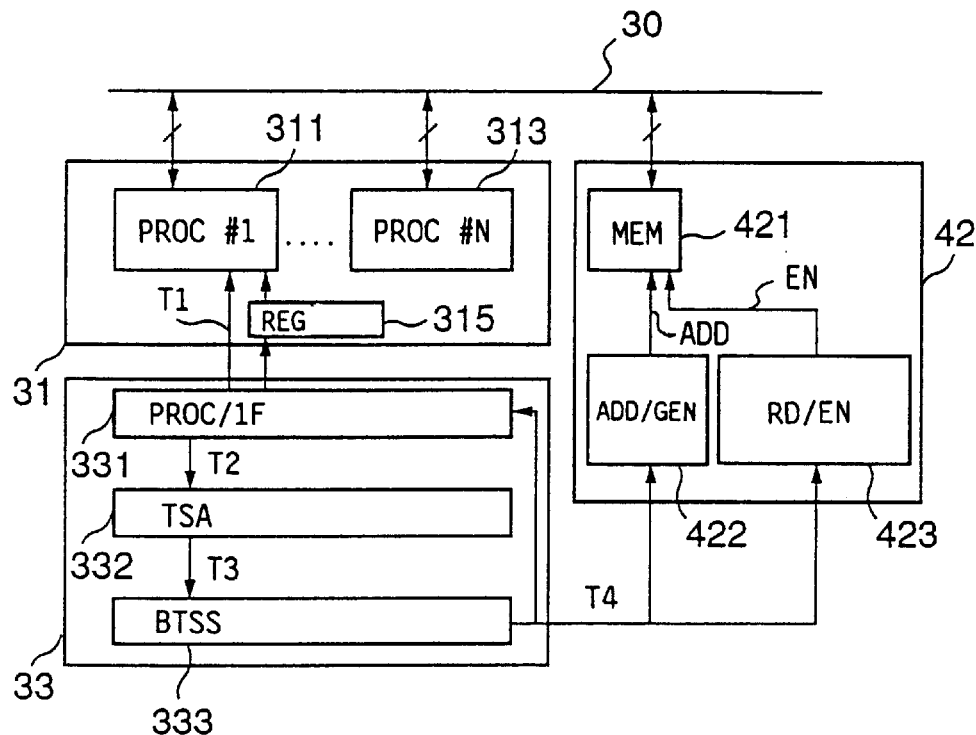
FIG. 13 is a block diagram of a second embodiment of the multiprocessor control system of the present invention.

FIG. 13 shows a second embodiment of the multiprocessor control system of the present invention. In FIG. 13, the elements which are essentially the same as corresponding elements in FIG. 11 are designated by the same reference numerals, and a description thereof will be omitted.

As shown in FIG. 13, in the present embodiment, the boot processor (PROC#1) 311 is provided with a register 315. The TSC 33 notifies a boot start timing to the boot processor 311 by changing a value of the register 315 in the boot processor 311. When starting the boot process, the TSC 33 gives a notification of the boot start timing to the boot processor 311 by changing the value of the register 315. The notification of the time-slot location to the boot processor 311 (T1) is already performed before the notification of the boot start timing.

Figure 14:
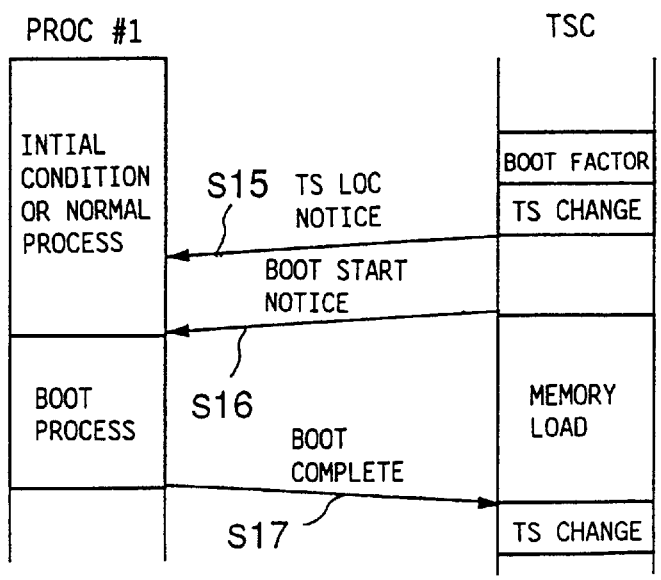
FIG. 14 is a diagram for explaining a sequence of the multiprocessor control system of FIG. 13.

FIG. 14 shows a sequence of the multiprocessor control system of FIG. 13.

As shown in FIG. 14, when the TSC 33 determines that a boot factor occurs in the boot processor 311, the TSC 33 changes the previous time slot and determines a time slot for the boot processor 311 among the time slots produced by the TSD 32. A time-slot location of the time slot is notified to the boot processor 311 by the TSC 33 (S15). The TSC 33 notifies the boot start timing to the boot processor 311 by changing the value of the register 315 (S16). After the boot process is terminated, the boot processor 311 notifies the TSC 33 of the boot completion (S17).

Figure 15:
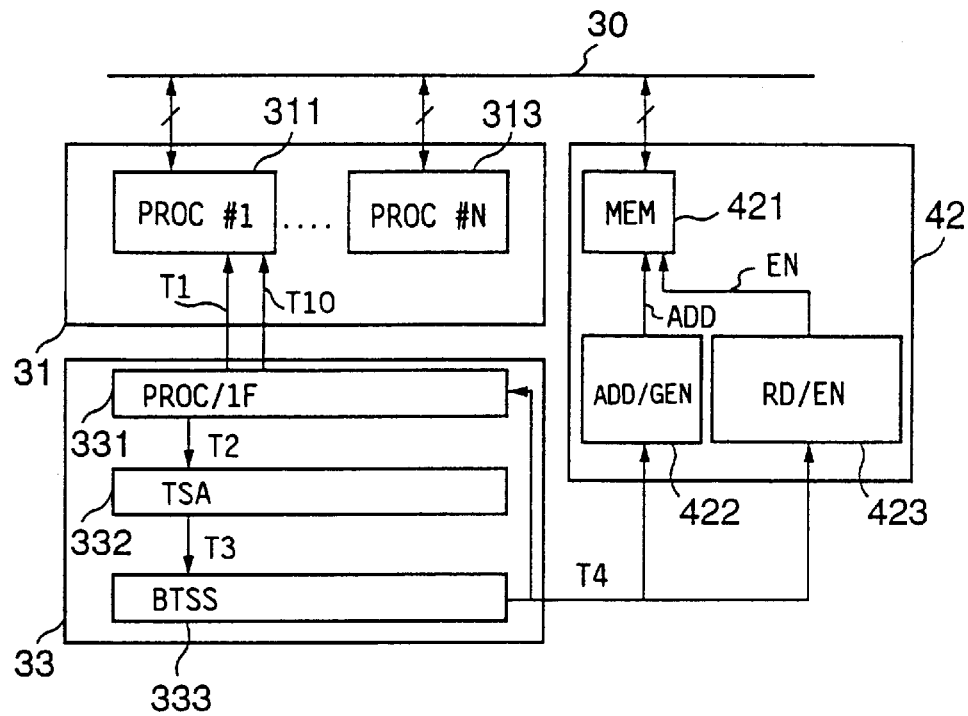
FIG. 15 is a block diagram of a third embodiment of the multiprocessor control system of the present invention.

FIG. 15 shows a third embodiment of the multiprocessor control system of the present invention. In FIG. 15, the elements which are essentially the same as corresponding elements in FIG. 11 are designated by the same reference numerals, and a description thereof will be omitted.

In the present embodiment, the boot processor (PROC#1) 311 is provided with the interrupt handler. As shown in FIG. 15, the TSC 33 notifies a boot start timing to the boot processor 311 by sending an interrupt to the boot processor 311 (T10). When starting the boot process, the TSC 33 gives a notification of the boot start timing to the boot processor 311 by sending an interrupt to the boot processor 311. In the boot processor 311, a jump to the interrupt handler is executed when the interrupt occurs.

Figure 16:
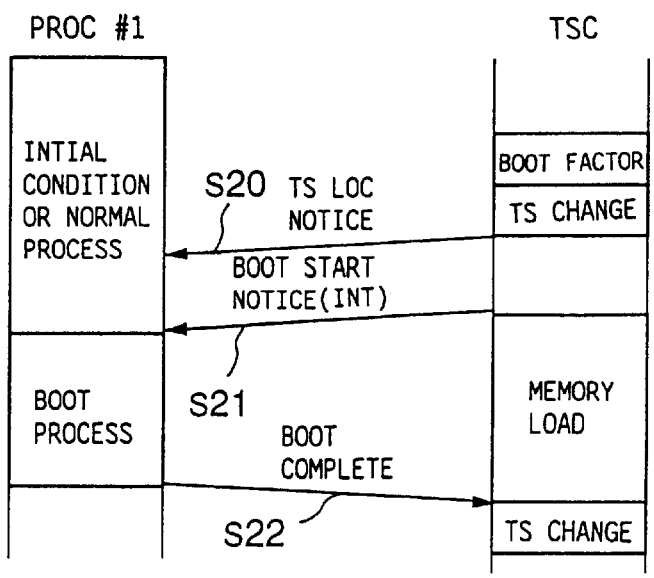
FIG. 16 is a diagram for explaining a sequence of the multiprocessor control system of FIG. 15.

FIG. 16 shows a sequence of the multiprocessor control system of FIG. 15.

As shown in FIG. 16, when the TSC 33 determines that a boot factor occurs in the boot processor 311, the TSC 33 changes the previous time slot and determines a time slot for the boot processor 311 among the time slots produced by the TSD 32. A time-slot location of the time slot is notified to the boot processor 311 by the TSC 33 (S20). The TSC 33 notifies the boot start timing to the boot processor 311 by sending an interrupt to the boot processor 311 (S21). After the boot process is terminated, the boot processor 311 notifies the TSC 33 of the boot completion (S22).

Figure 17:
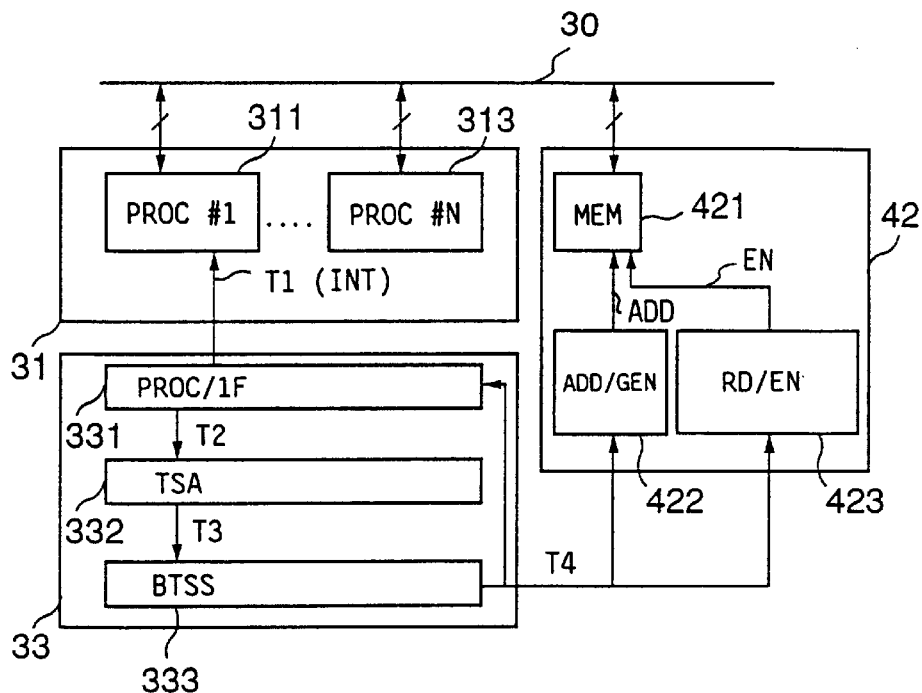
FIG. 17 is a block diagram of a fourth embodiment of the multiprocessor control system of the present invention.

FIG. 17 shows a fourth embodiment of the multiprocessor control system of the present invention. In FIG. 17, the elements which are essentially the same as corresponding elements in FIG. 11 are designated by the same reference numerals, and a description thereof will be omitted.

In the present embodiment, as shown in FIG. 17, the TSC 33 notifies a time-slot location (determined by the TSC 33) to the boot processor 311 by sending an interrupt to the boot processor 311 (T1) before the notification of a boot start timing to the boot processor 311. When starting the boot process, the TSC 33 gives the notification of the boot start timing (the boot start trigger) to the boot processor 311 by sending an interrupt to the boot processor 311. In the boot processor 311, a jump to the interrupt handler is executed when the interrupt occurs. The boot process for the boot processor is started.

Figure 18:
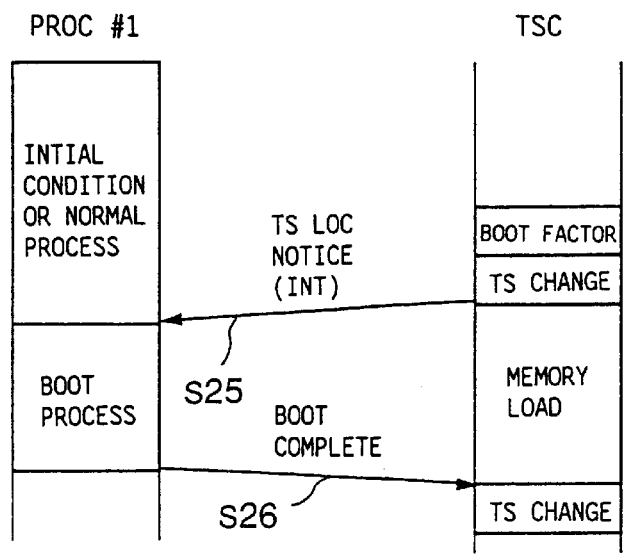
FIG. 18 is a diagram for explaining a sequence of the multiprocessor control system of FIG. 17.

FIG. 18 shows a sequence of the multiprocessor control system of FIG. 17.

As shown in FIG. 18, when the TSC 33 determines that a boot factor occurs in the boot processor 311, the TSC 33 changes the previous time slot and determines a time slot for the boot processor 311 among the time slots produced by the TSD 32. A time-slot location of the time slot is notified to the boot processor 311 by sending an interrupt to the boot processor (S25). The TSC 33 notifies the boot start timing to the boot processor 311 by sending an interrupt to the boot processor 311. After the boot process is terminated, the boot processor 311 notifies the TSC 33 of the boot completion (S26).

Figure 19:
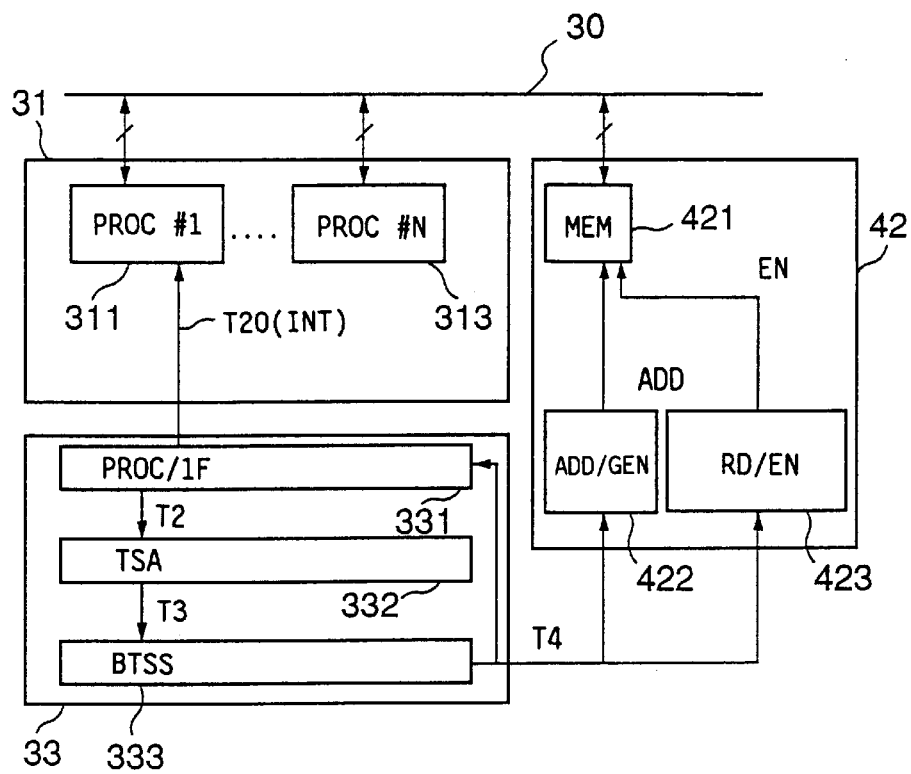
FIG. 19 is a block diagram of a fifth embodiment of the multiprocessor control system of the present invention.

FIG. 19 shows a fifth embodiment of the multiprocessor control system of the present invention. In FIG. 19, the elements which are essentially the same as corresponding elements in FIG. 11 are designated by the same reference numerals, and a description thereof will be omitted.

In the present embodiment, as shown in FIG. 19, the TSC 33 notifies a time-slot number and a time-slot location (both determined by the TSC 33) to the boot processor 311 by sending an interrupt to the boot processor 311 (T20) before the notification of a boot start timing to the boot processor 311. When starting the boot process, the TSC 33 gives the notification of the boot start timing to the boot processor 311 by sending an interrupt to the boot processor 311. In the boot processor 311, a jump to the interrupt handler is executed when the interrupt occurs. The boot process for the boot processor is started.

Figure 20:
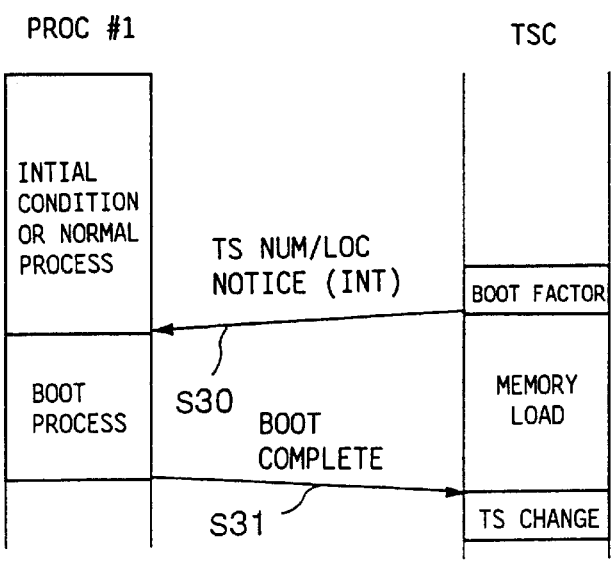
FIG. 20 is a diagram for explaining a sequence of the multiprocessor control system of FIG. 19.

FIG. 20 shows a sequence of the multiprocessor control system of FIG. 19.

As shown in FIG. 20, when the TSC 33 determines that a boot factor occurs in the boot processor 311, the TSC 33 determines a time slot for the boot processor 311 among the time slots produced by the TSD 32. A time-slot number and a time-slot location of the determined time slot are notified to the boot processor 311 by sending an interrupt to the boot processor (S30). The TSC 33 notifies the boot start timing to the boot processor 311 by sending an interrupt to the boot processor 311. After the boot process is terminated, the boot processor 311 notifies the TSC 33 of the boot completion (S31).

Figure 21:
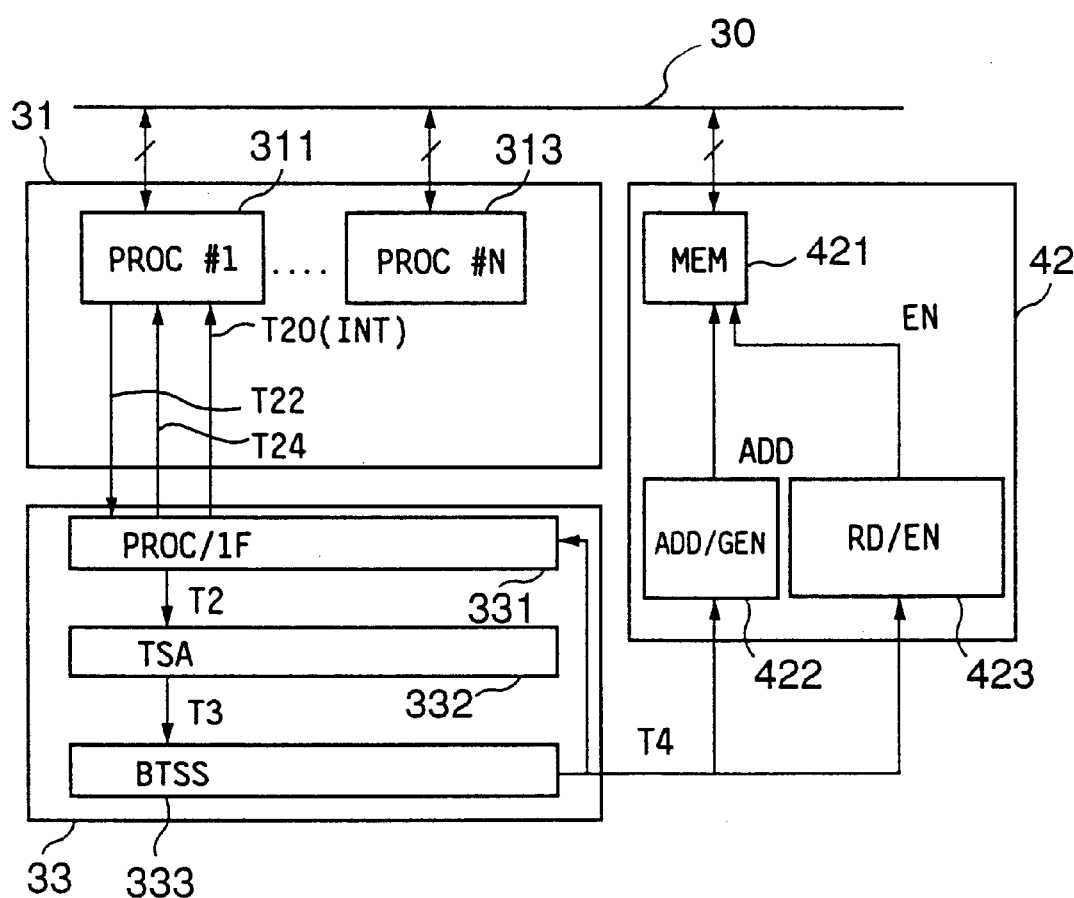
FIG. 21 is a block diagram of a sixth embodiment of the multiprocessor control system of the present invention.

FIG. 21 shows a sixth embodiment of the multiprocessor control system of the present invention. In FIG. 21, the elements which are essentially the same as corresponding elements in FIG. 11 are designated by the same reference numerals, and a description thereof will be omitted.

In the present embodiment, as shown in FIG. 21, the boot processor 311 sends a boot request to the TSC 33 (T22). The TSC 33 recognizes the boot request transmitted by each of the "N" processors and sends a response to the boot request to only the boot processor having transmitted the boot request. The TSC 33 sends a response to the boot processor 311 (T24). After this, the TSC 33 notifies a time-slot number and a time-slot location to the boot processor 311 by sending an interrupt to the boot processor 311 (T20). When starting the boot process, the TSC 33 gives the notification of the boot start timing to the boot processor 311 by sending an interrupt to the boot processor 311. In the boot processor 311, a jump to the interrupt handler is executed when the interrupt occurs. The boot process for the boot processor is started.

Figure 22:
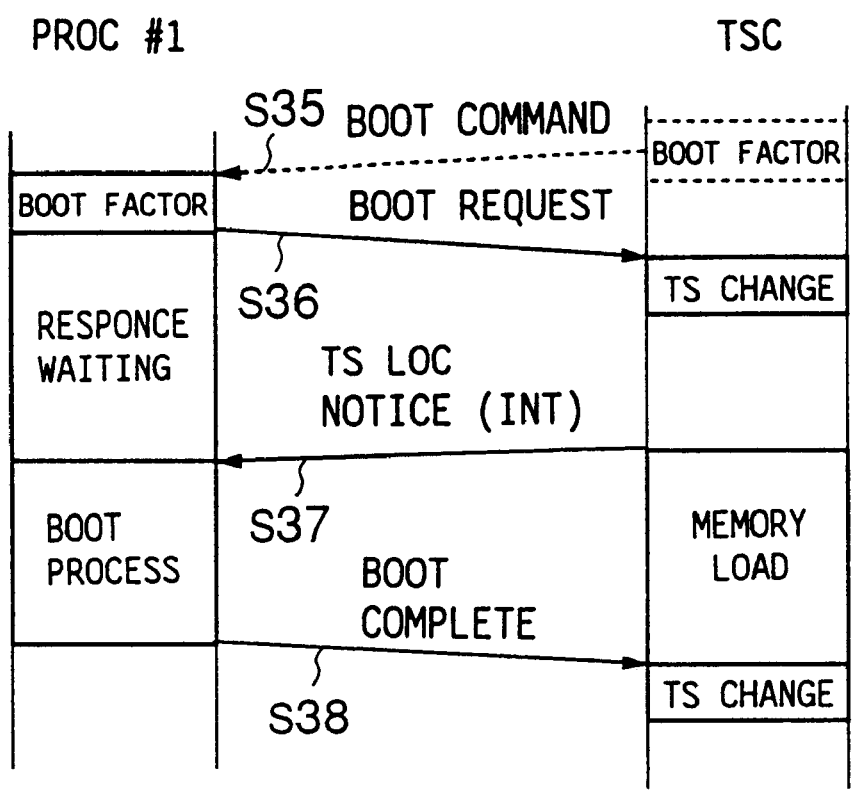
FIG. 22 is a diagram for explaining a sequence of the multiprocessor control system of FIG. 21.

FIG. 22 shows a sequence of the multiprocessor control system of FIG. 21.

As shown in FIG. 22, the TSC 33 sends a boot command to each of the "N" processors so as to ask the processor whether a boot factor occurs in the processor (S35). When a boot factor occurs in the boot processor 311, the boot processor 311 sends a boot request to the TSC 33 (S36). When the boot request from the boot processor 311 is received, the TSC 33 determines a time slot for the boot processor 311 among the time slots produced by the TSD 32. A time-slot location of the time slot are notified to the boot processor 311 by sending an interrupt to the boot processor (S37). The TSC 33 notifies the boot start timing to the boot processor 311 by sending an interrupt to the boot processor 311. After the boot process is terminated, the boot processor 311 notifies the TSC 33 of the boot completion (S38).

Figure 23:
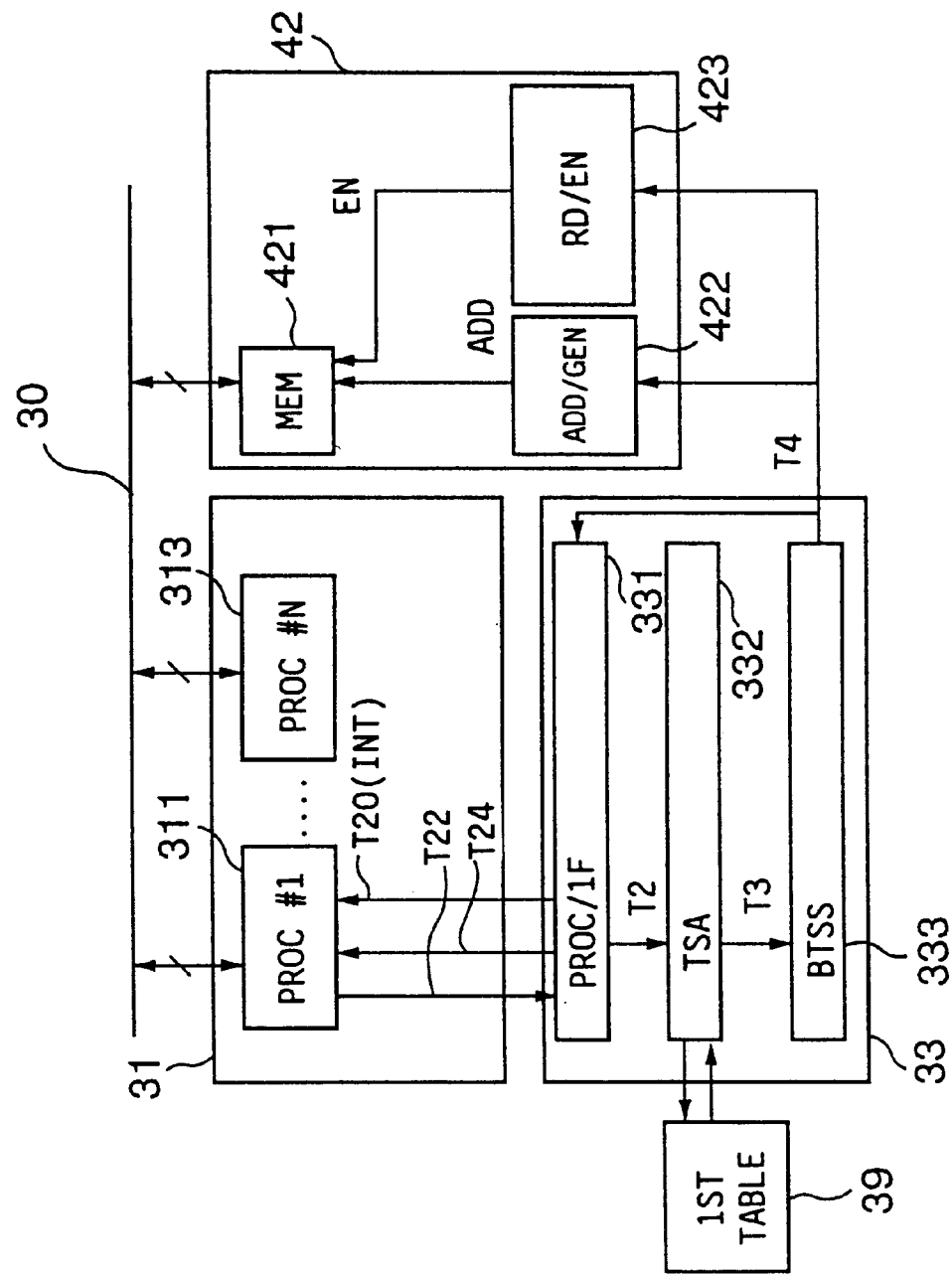
FIG. 23 is a block diagram of a seventh embodiment of the multiprocessor control system of the present invention.

FIG. 23 shows a seventh embodiment of the multiprocessor control system of the present invention. In FIG. 23, the elements which are essentially the same as corresponding elements in FIG. 11 are designated by the same reference numerals, and a description thereof will be omitted.

In the present embodiment, as shown in FIG. 21, the boot processor 311 sends a boot request to the TSC 33 (T22). The processor-status detection unit (P/SD) 35 detects processor-status data of the "N" processors, and sends the result of the detection to the TSC 33. Hence, the TSC 33 recognizes the boot request transmitted by each of the "N" processors and sends a response to the boot request to only the boot processor having transmitted the boot request (T24). The PROC/IF 331 outputs the boot processor parameter from the boot processor 311 to the TSA 332 (T2). The TSA 332 assigns the time slots, produced by the TSD 32, to the "N" processors by taking account of the number "N" of the processors, the bandwidth, and the first table 39. After this, the TSC 33 notifies a time-slot number and a time-slot location to the boot processor 311 by sending an interrupt to the boot processor 311 (T20). When starting the boot process, the TSC 33 gives the notification of the boot start timing to the boot processor 311 by sending an interrupt to the boot processor 311. In the boot processor 311, a jump to the interrupt handler is executed when the interrupt occurs. The boot process for the boot processor is started.

Figure 24:
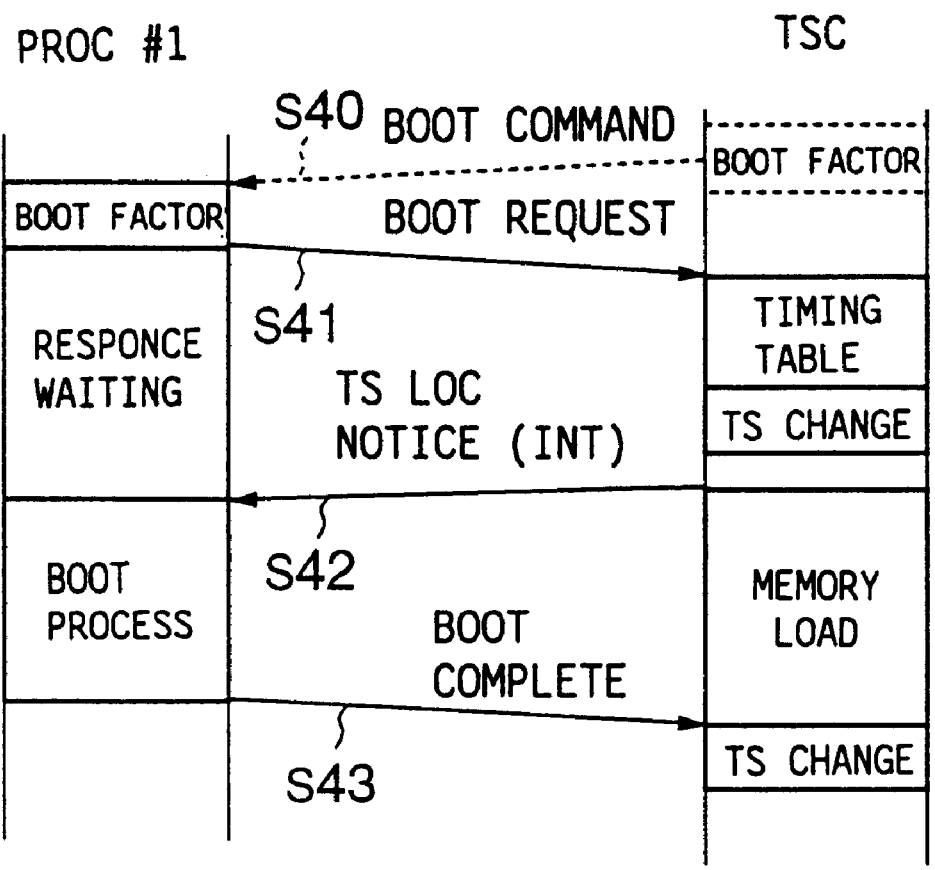
FIG. 24 is a diagram for explaining a sequence of the multiprocessor control system of FIG. 23.

FIG. 24 shows a sequence of the multiprocessor control system of FIG. 23.

As shown in FIG. 24, the TSC 33 sends a boot command to each of the "N" processors so as to ask the processor whether a boot factor occurs in the processor (S40). When a boot factor occurs in the boot processor 311, the boot processor 311 sends a boot request to the TSC 33 (S41). When the boot request from the boot processor 311 is received, the TSC 33 determines a time slot for the boot processor 311 among the time slots produced by the TSD 32. A time-slot location of the time slot is notified to the boot processor 311 by sending an interrupt to the boot processor (S42). The TSC 33 notifies the boot start timing to the boot processor 311 by sending an interrupt to the boot processor 311. After the boot process is terminated, the boot processor 311 notifies the TSC 33 of the boot completion (S43).

Figure 25:
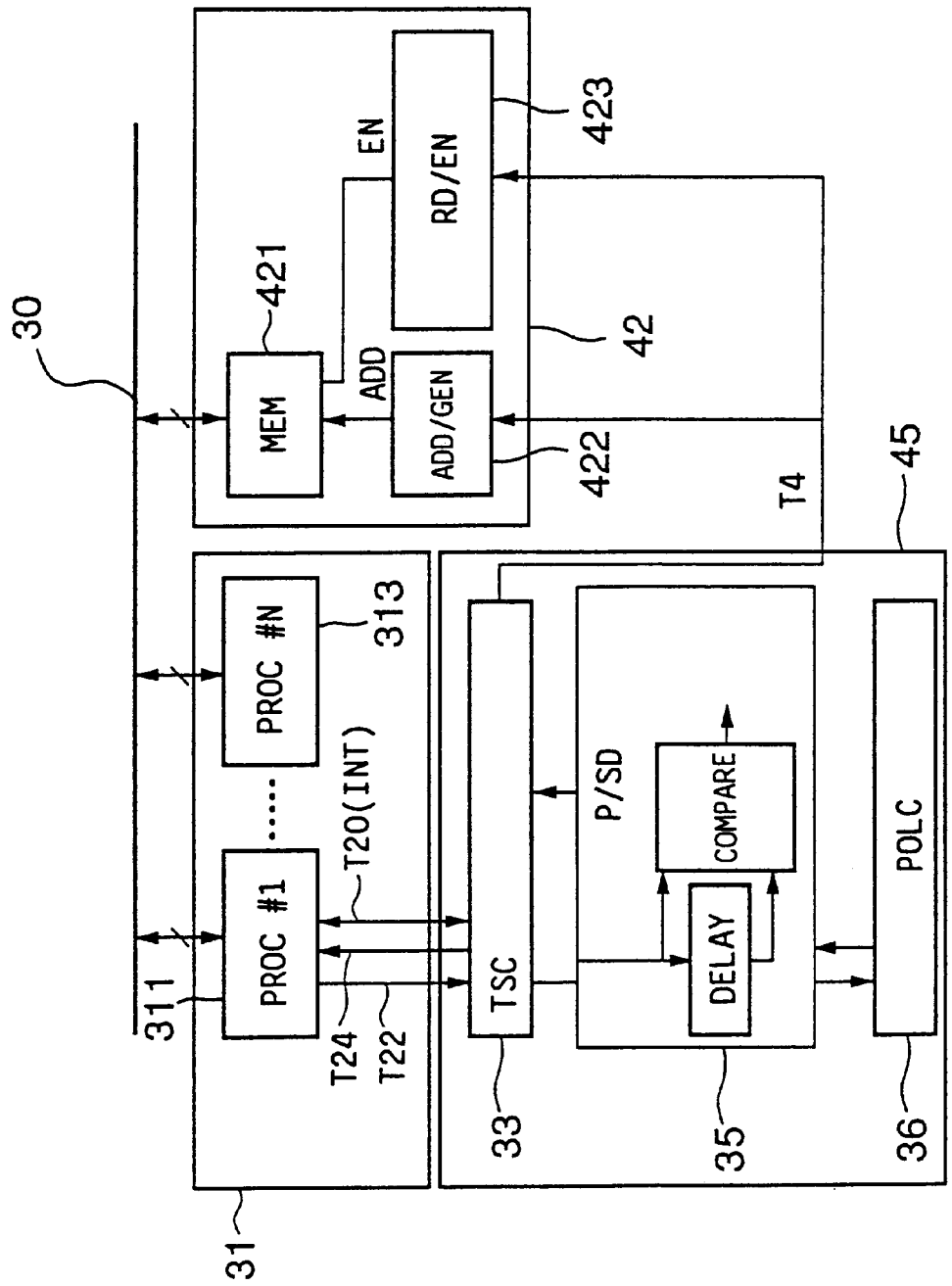
FIG. 25 is a block diagram of an eighth embodiment of the multiprocessor control system of the present invention.

FIG. 25 shows an eighth embodiment of the multiprocessor control system of the present invention. In FIG. 25, the elements which are essentially the same as corresponding elements in FIG. 11 are designated by the same reference numerals, and a description thereof will be omitted.

In the present embodiment, as shown in FIG. 25, the boot processor 311 sends a boot request to the TSC 33 (T22). The P/SD 35 detects the processor-status data of the "N" processors by performing polling of the "N" processors in accordance with the polling timing signal from the POLC 36. The P/SD 35 sends the result of the detection to the TSC 33. Hence, the TSC 33 recognizes the boot request transmitted by one of the "N" processors and sends a boot-request response to only the boot processor having transmitted the boot request (T24). The TSC 33 notifies a time-slot number and a time-slot location to the boot processor 311 by sending an interrupt to the boot processor 311 (T20). When starting the boot process, the TSC 33 gives the notification of the boot start timing to the boot processor 311 by sending an interrupt to the boot processor 311. In the boot processor 311, a jump to the interrupt handler is executed when the interrupt occurs. The boot process for the boot processor is started.

In the P/SD 35, the processor-status data of the "N" processors are compared with the previous processor-status data thereof every time the polling of the "N" processors is performed. When a piece of the processor-status data of the "N" processors does not match that of the previous processor-status data, the P/SD 35 determines that the processor of concern has transmitted the boot request to the TSC 33.

Figure 26:
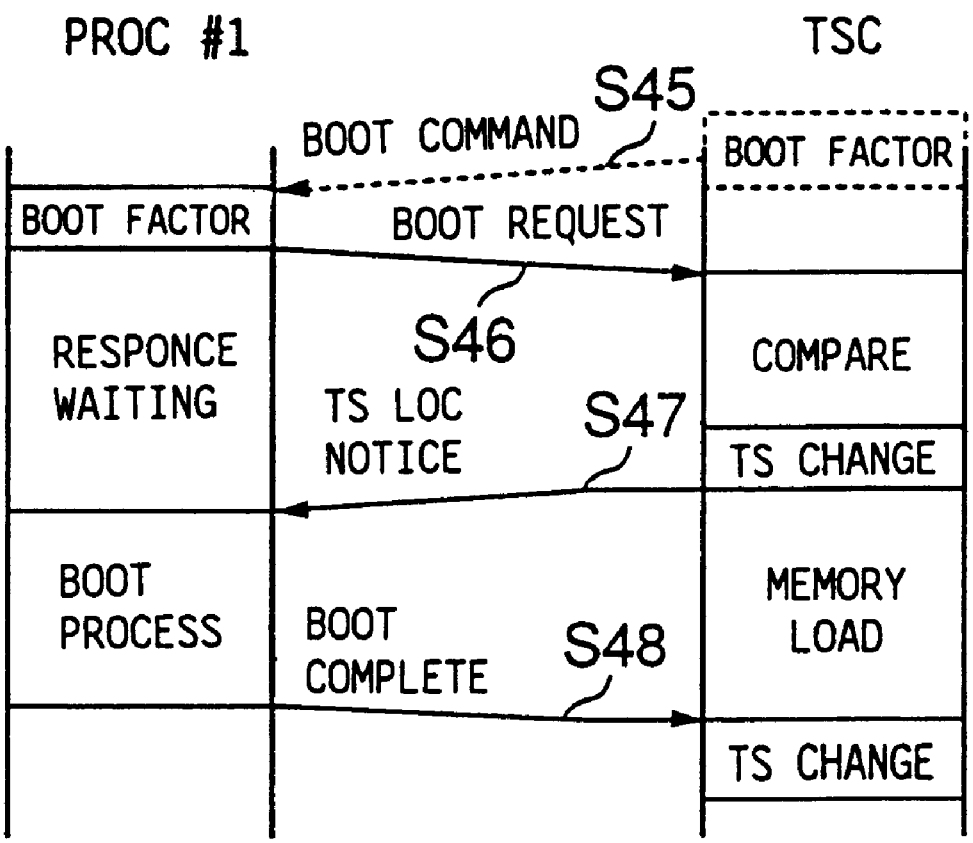
FIG. 26 is a diagram for explaining a sequence of the multiprocessor control system of FIG. 25.

FIG. 26 shows a sequence of the multiprocessor control system of FIG. 25.

As shown in FIG. 26, the TSC 33 sends a boot command to each of the "N" processors so as to ask the processor whether a boot factor occurs in the processor (S45). When a boot factor occurs in the boot processor 311, the boot processor 311 sends a boot request to the TSC 33 (S46). When the boot request from the boot processor 311 is received, the TSC 33 determines a time slot for the boot processor 311 among the time slots produced by the TSD 32. A time-slot location of the time slot is notified to the boot processor 311 by sending an interrupt to the boot processor (S47). The TSC 33 notifies the boot start timing to the boot processor 311 by sending an interrupt to the boot processor 311. After the boot process is terminated, the boot processor 311 notifies the TSC 33 of the boot completion (S48).

Figure 27:
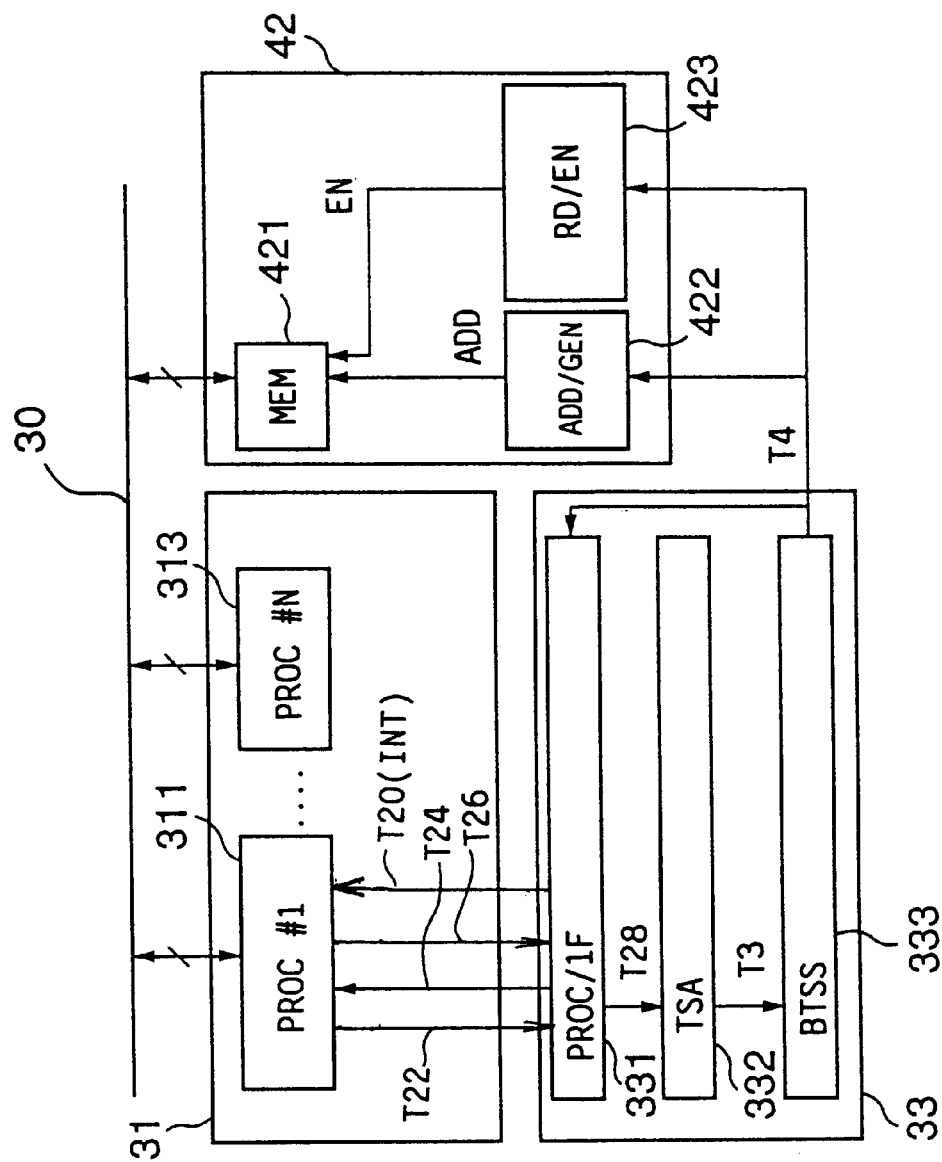
FIG. 27 is a block diagram of a ninth embodiment of e multiprocessor control system of the present invention.

FIG. 27 shows a ninth embodiment of the multiprocessor control system of the present invention. In FIG. 27, the elements which are essentially the same as corresponding elements in FIG. 11 are designated by the same reference numerals, and a description thereof will be omitted.

In the present embodiment, the boot speeds of the "N" processors are different from each other. The P/SD 35 detects the processor-status data of the "N" processors by performing polling of the "N" processors, and the processor status data of the "N" processors include the boot speed as shown in FIG. 6. As shown in FIG. 27, the boot processor 311 sends a boot speed to the TSC 33 (T26). The P/SD 35 recognizes the boot speed of the boot processor 311 based on the processor-status data of the boot processor 331. By taking account of the boot-active/inactive status data and the boot speed of the boot processor 331, the TSA 332 assigns the time slots, produced by the TSD 32, to the "N" processors (T28). The TSC 33 notifies a time-slot number and a time-slot location to the boot processor 311 by sending an interrupt to the boot processor 311 (T20).

Figure 28:
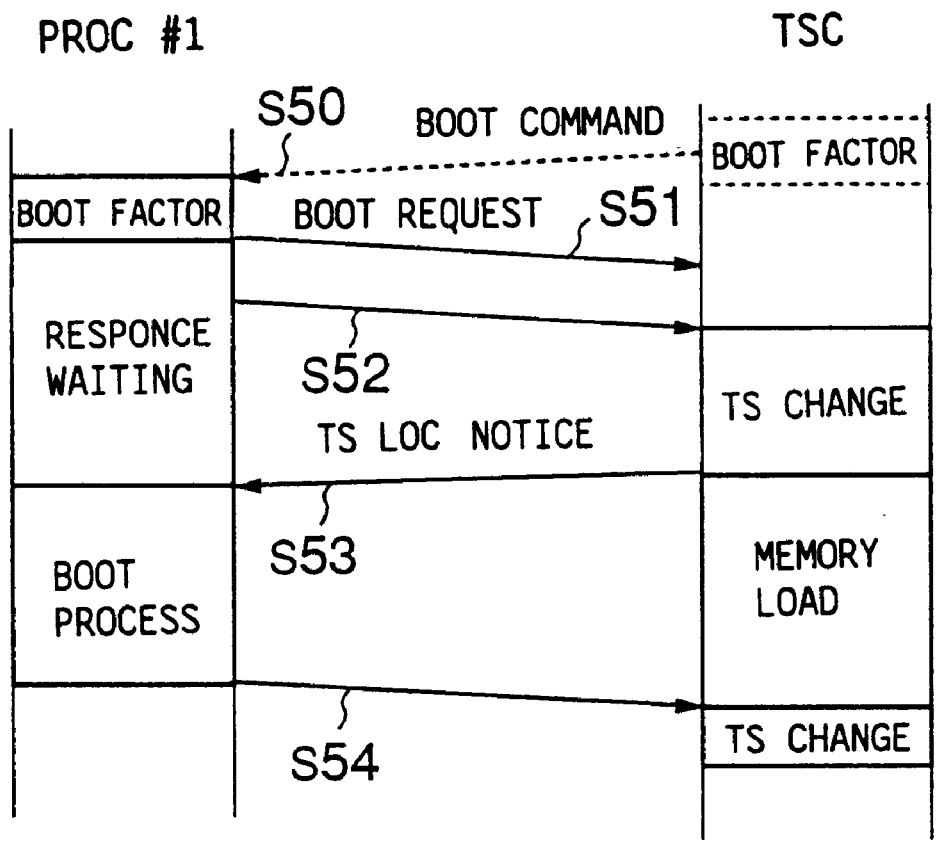
FIG. 28 is a diagram for explaining a sequence of the multiprocessor control system of FIG. 27.

FIG. 28 shows a sequence of the multiprocessor control system of FIG. 27.

As shown in FIG. 28, the TSC 33 sends a boot command to each of the "N" processors so as to ask the processor whether a boot factor occurs in the processor (S50). When a boot factor occurs in the boot processor 311, the boot processor 311 sends a boot request to the TSC 33 (S51). Further, the boot processor 331 sends a boot speed to the TSC 33 (S52). When the boot request from the boot processor 311 is received, the TSC 33 determines a time slot for the boot processor 311 among the time slots produced by the TSD 32. A time-slot location of the time slot is notified to the boot processor 311 by sending an interrupt to the boot processor (S53). The TSC 33 notifies the boot start timing to the boot processor 311 by sending an interrupt to the boot processor 311. After the boot process is terminated, the boot processor 311 notifies the TSC 33 of the boot completion (S54).

Figure 29:
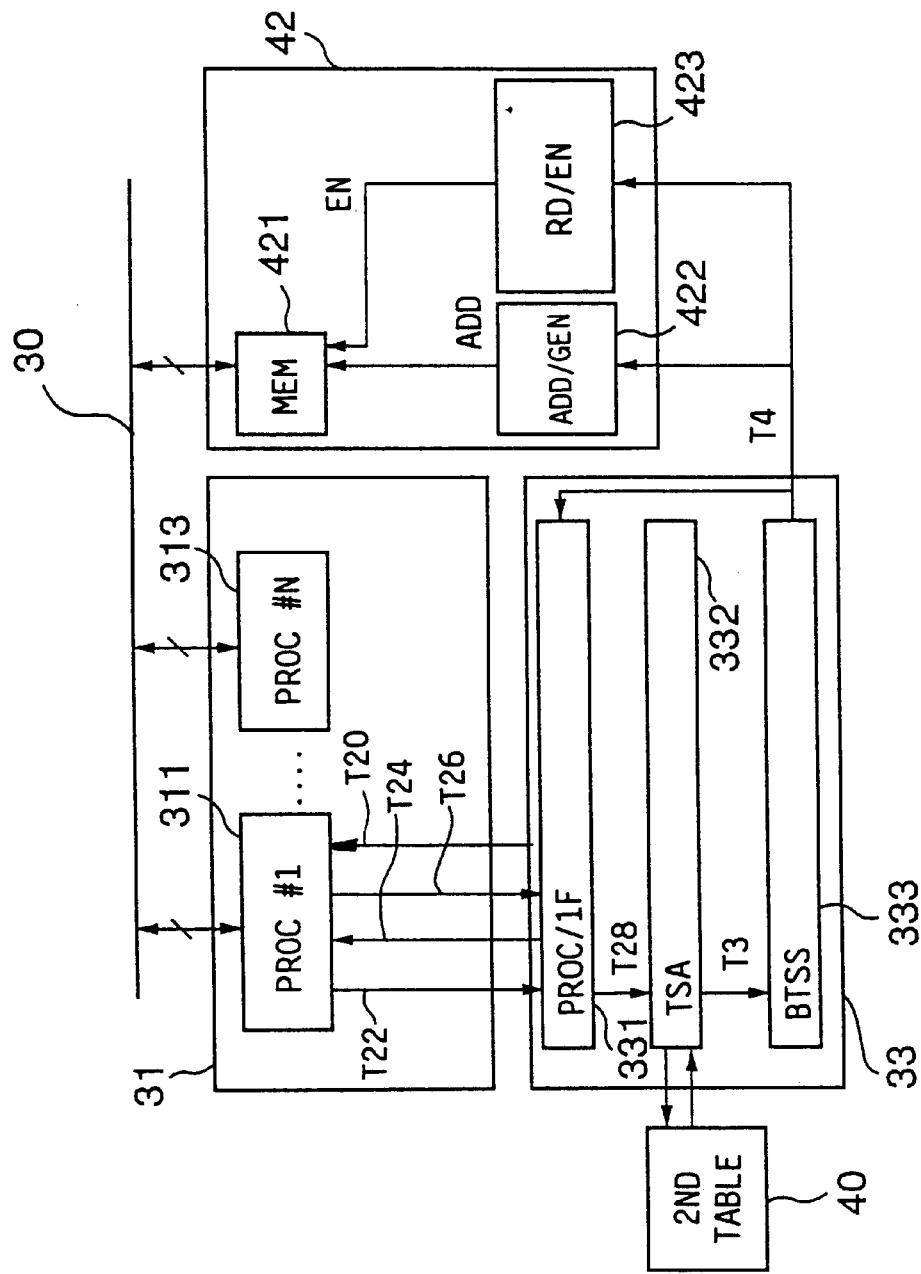
FIG. 29 is a block diagram of a tenth embodiment of the multiprocessor control system of the present invention.

FIG. 29 shows a tenth embodiment of the multiprocessor control system of the present invention. In FIG. 29, the elements which are essentially the same as corresponding elements in FIG. 11 are designated by the same reference numerals, and a description thereof will be omitted.

In the present embodiment, the boot speeds of the "N" processors are different from each other. The P/SD 35 detects the processor-status data of the "N" processors by performing polling of the "N" processors, and the processor status data of the "N" processors include the boot speed as shown in FIG. 6. As shown in FIG. 29, the boot processor 311 notifies its boot speed to the TSC 33 (T26). The P/SD 35 recognizes the boot speed of the boot processor 311 based on the processor-status data of the boot processor 331. The TSA 332 reads the predetermined boot-active/inactive status data of the boot processor 331 from the second table 40. By taking account of the boot-active/inactive status data (read from the second table 40) and the boot speed of the boot processor 331, the TSA 332 assigns the time slots, produced by the TSD 32, to the "N" processors (T28).

Figure 30:
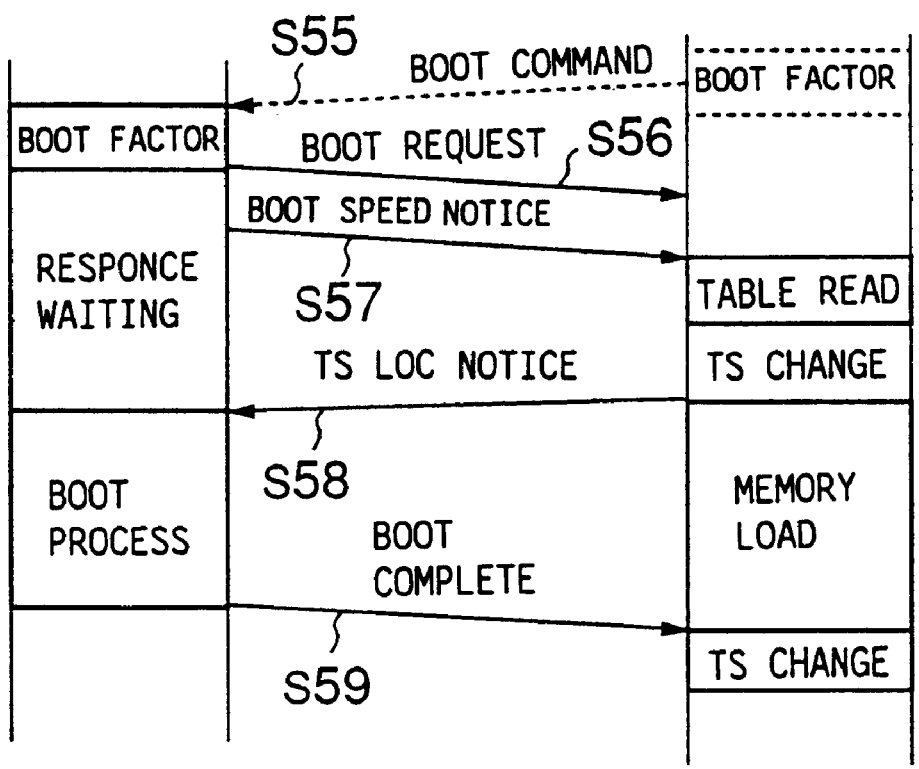
FIG. 30 is a diagram for explaining a sequence of the multiprocessor control system of FIG. 29.

FIG. 30 shows a sequence of the multiprocessor control system of FIG. 29.

As shown in FIG. 30, the TSC 33 sends a boot command to each of the "N" processors so as to ask the processor whether a boot factor occurs in the processor (S55). When a boot factor occurs in the boot processor 311, the boot processor 311 sends a boot request to the TSC 33 (S56). Further, the boot processor 331 notifies its boot speed to the TSC 33 (S57). When the boot request from the boot processor 311 is received, the TSC 33 determines a time slot for the boot processor 311 among the time slots produced by the TSD 32. A time-slot location of the time slot is notified to the boot processor 311 by sending an interrupt to the boot processor (S58). The TSC 33 notifies the boot start timing to the boot processor 311 by sending an interrupt to the boot processor 311. After the boot process is terminated, the boot processor 311 notifies the TSC 33 of the boot completion (S59).

Figure 31:
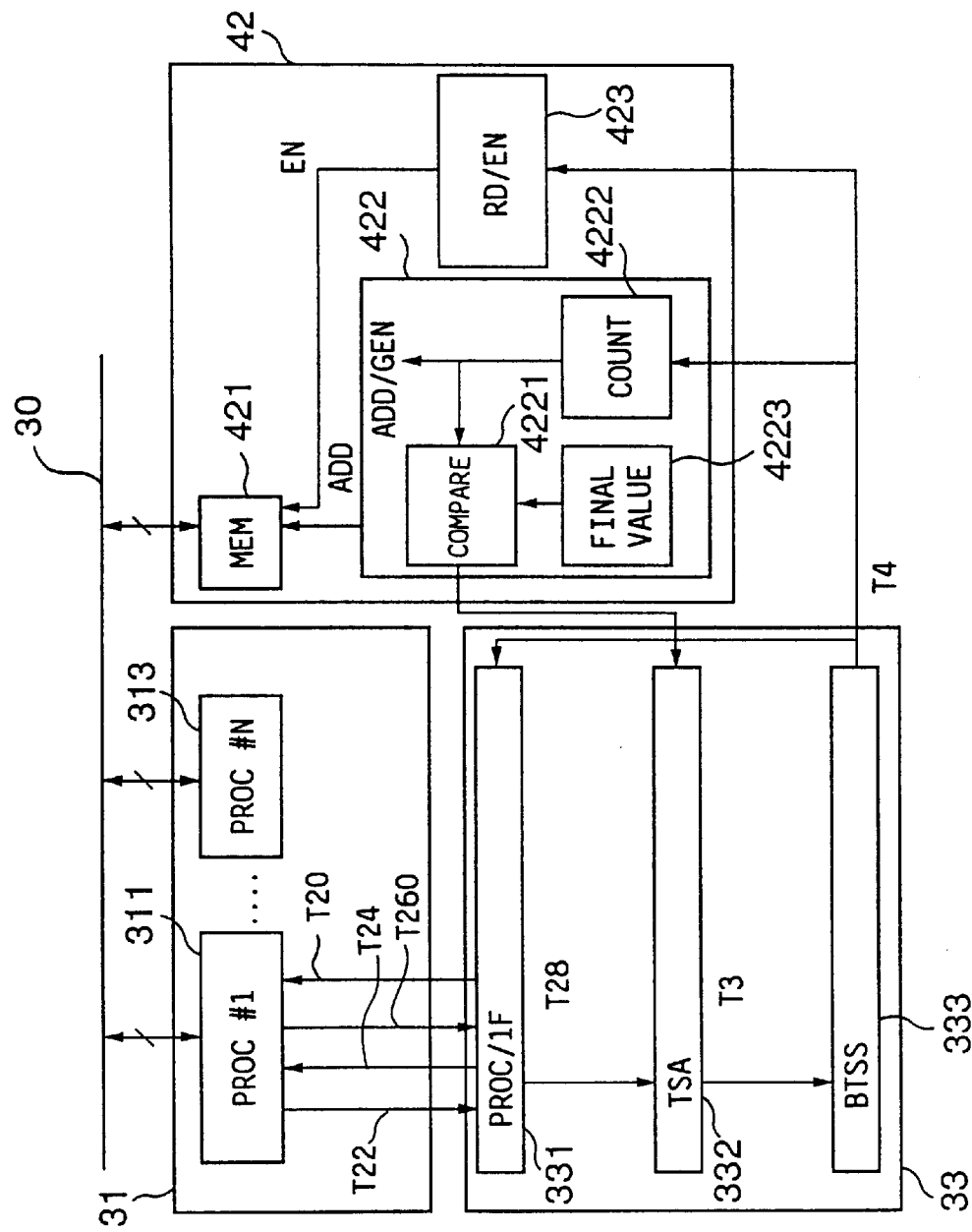
FIG. 31 is a block diagram of an eleventh embodiment of the multiprocessor control system of the present invention.

FIG. 31 shows an eleventh embodiment of the multiprocessor control system of the present invention. In FIG. 31, the elements which are essentially the same as corresponding elements in FIG. 11 are designated by the same reference numerals, and a description thereof will be omitted.

In the present embodiment, the boot data lengths of the "N" processors are different from each other. The P/SD 35 detects the processor-status data of the "N" processors by performing polling of the "N" processors, and the processor status data of the "N" processors include the boot data length as shown in FIG. 6. As shown in FIG. 31, the boot processor 311 sends its boot speed and its boot data length to the TSC 33 (T260). The P/SD 35 recognizes the boot data length of the boot processor 311 based on the processor-status data of the boot processor 331. By taking account of the boot-active/inactive status data (read from the second table 40) and the boot speed of the boot processor 331, the TSA 332 assigns the time slots, produced by the TSD 32, to the "N" processors (T28).

In the present embodiment, the address generating part (ADD/GEN) 422 of the storage device 42 includes a comparator (COMPARE) 4221, a processor counter (COUNT) 4222, and a final value setting part 4223. An end address of the boot data in the memory 421 is determined by the boot data length of the boot processor 311. In the final value setting part 4223, a final value corresponding to the end address of the boot data in the memory 421 is retained. The comparator 4221 compares a memory address count output by the processor counter 4222 with the final value output by the final value setting part 4223. When an end time-slot location is notified to the storage device 42 by the TSC 33 during the memory loading, the comparator 4221 outputs an ON signal to the TSA 332. Hence, the TSC 33 detects an end of the reading of the boot data from the memory 421 by the ON signal output by the storage device 42. After the end of the reading is detected, the TSC 33 starts performing a next process.

Figure 32:
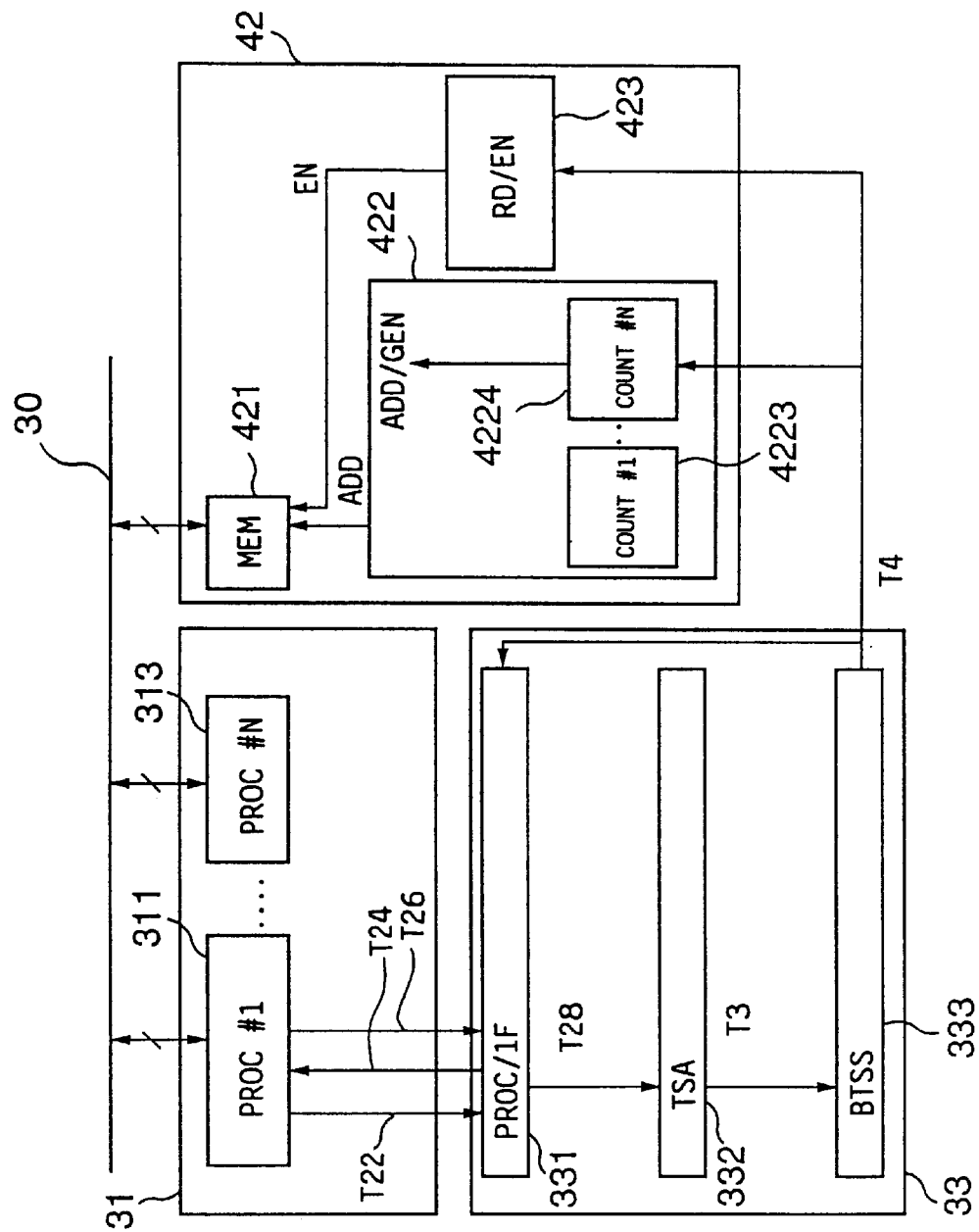
FIG. 32 is a block diagram of a twelfth embodiment of the multiprocessor control system of the present invention.

FIG. 32 shows a twelfth embodiment of the multiprocessor control system of the present invention. In FIG. 32, the elements which are essentially the same as corresponding elements in FIG. 11 are designated by the same reference numerals, and a description thereof will be omitted.

In the present embodiment, the address generating part (ADD/GEN) 422 of the storage device 42 includes a corresponding number of address counters (COUNT#1, COUNT#N) 4224, 4225 which respectively correspond to the plurality of processors 311, 313 (the "N" processors) of the processor block 31. Each of the "N" address counters 4224, 4225 retains an address (ADD) of the memory 421 (where the boot data for the processor of concern is stored). Hence, when the BTSS 333 determines a time slot for the boot processor 311 among the time slots assigned by the TSA 332 and notifies a time-slot location to the storage device 42, the address counter 4224 outputs a memory address signal (ADD) indicating the retained address to the memory 421. The multiprocessor control system of the present embodiment is effective in speedily starting the boot process for the boot processor 311.

Figure 33:
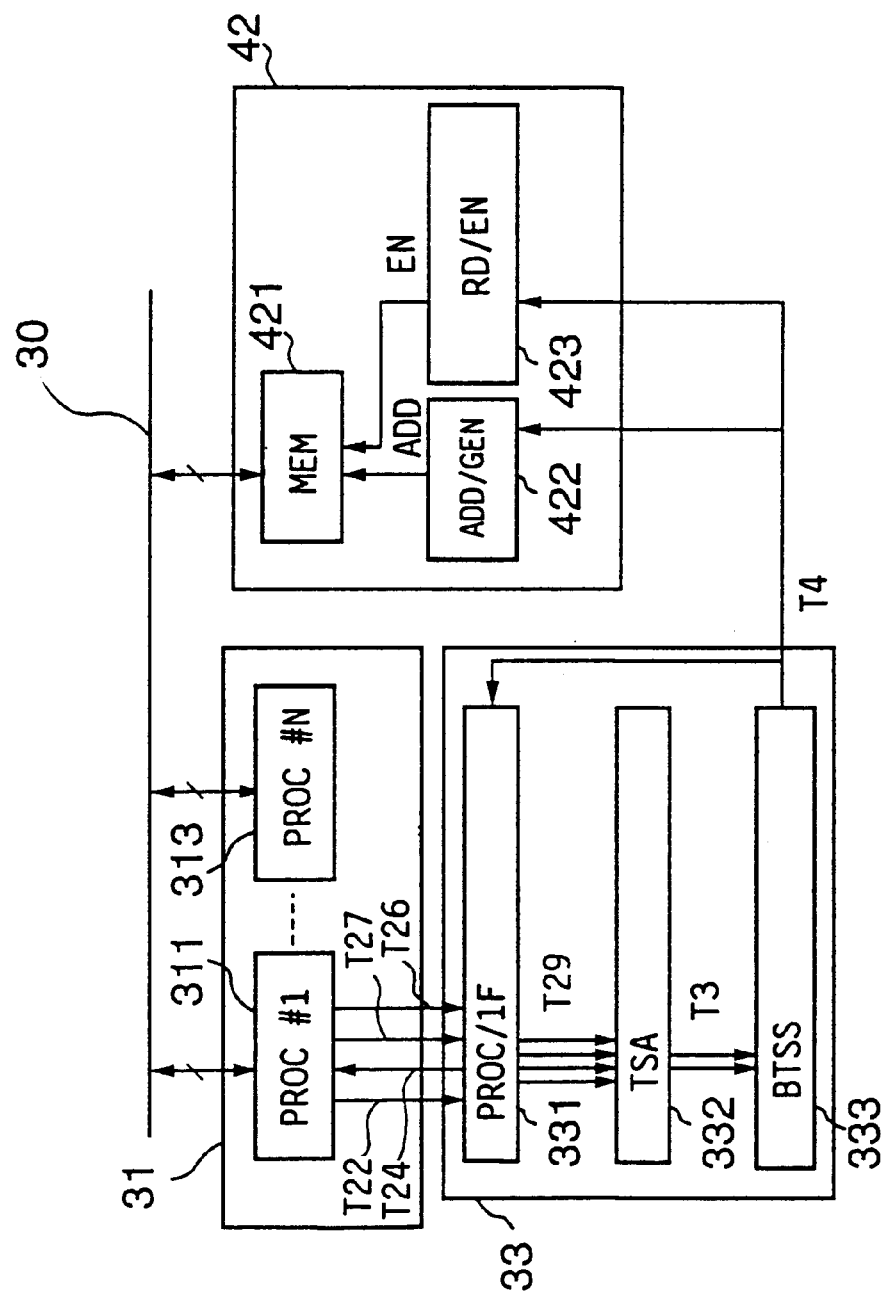
FIG. 33 is a block diagram of a thirteenth embodiment of the multiprocessor control system of the present invention.

FIG. 33 shows a thirteenth embodiment of the multiprocessor control system of the present invention. In FIG. 33, the elements which are essentially the same as corresponding elements in FIG. 11 are designated by the same reference numerals, and a description thereof will be omitted.

In the present embodiment, the boot processor 311 has plural application programs which can be loaded to the boot processor 311 as the boot data. Such application programs are stored in the storage device 42. When sending a boot request to the TSC 33, the boot processor 311 notifies its boot request application type to the TSC 33 (T27). By taking account of the boot-active/inactive status data, the boot speed and the application type of the boot processor 331, the TSA 332 assigns the time slots, produced by the TSD 32, to the "N" processors (T29).

The boot processor 331 notifies the application type to the TSC 33 as follows. The P/SD 35 detects the processor-status data of the "N" processors by performing polling of the "N" processors, and the processor status data of the "N" processors include the boot request application type as shown in FIG. 6. As shown in FIG. 33, the boot processor 311 sends its boot speed and its application type to the TSC 33. The P/SD 35 recognizes the boot request application type of the boot processor 311 based on the processor-status data of the boot processor 331, and supplies the result to the TSC 33.

Figure 34:
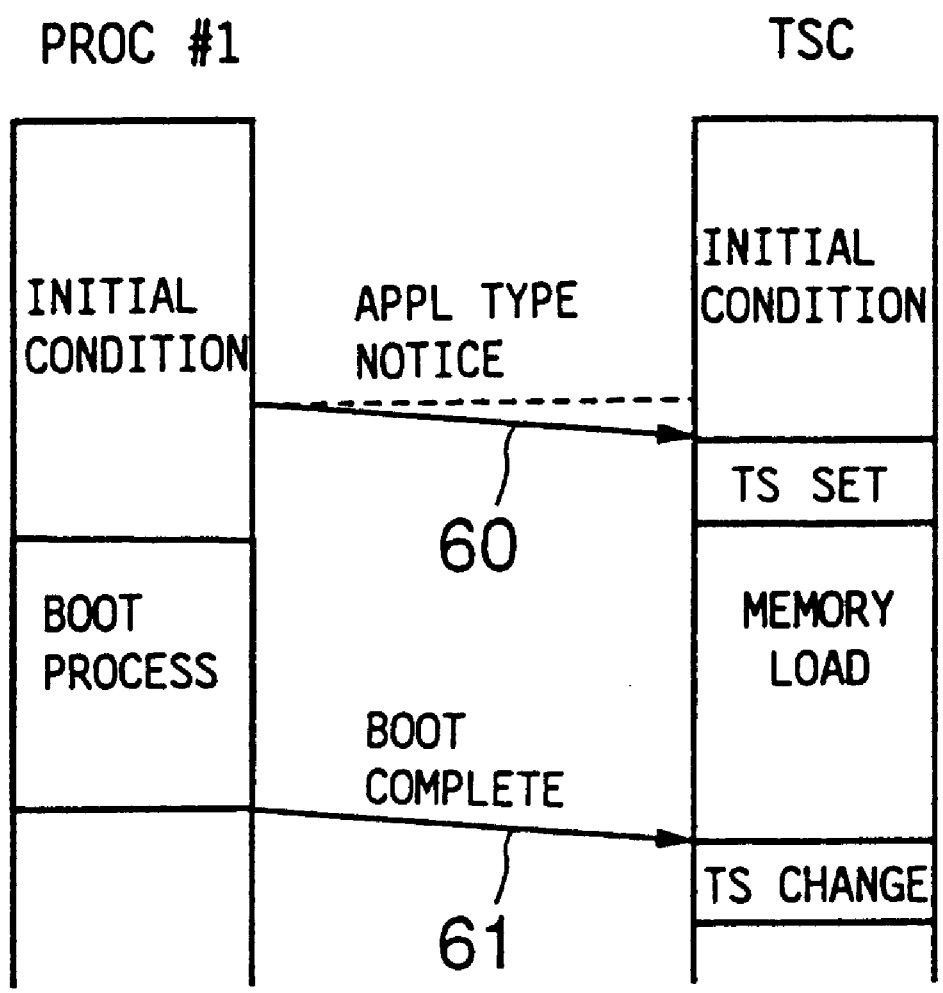
FIG. 34 is a diagram for explaining a sequence of the multiprocessor control system of FIG. 33.

FIG. 34 shows a sequence of the multiprocessor control system of FIG. 33.

As shown in FIG. 34, the boot processor 331 sends a boot request application type to the TSC 33 together with a boot request (60). The TSC 33 receives the application type and the boot request from the boot processor 331, and determines a time slot for the boot processor 331 among the time slots produced by the TSD 32, so that a boot process for the boot processor 331 is carried out. After the boot process is terminated, the boot processor 311 notifies the TSC 33 of the boot completion (61).

Figure 35:
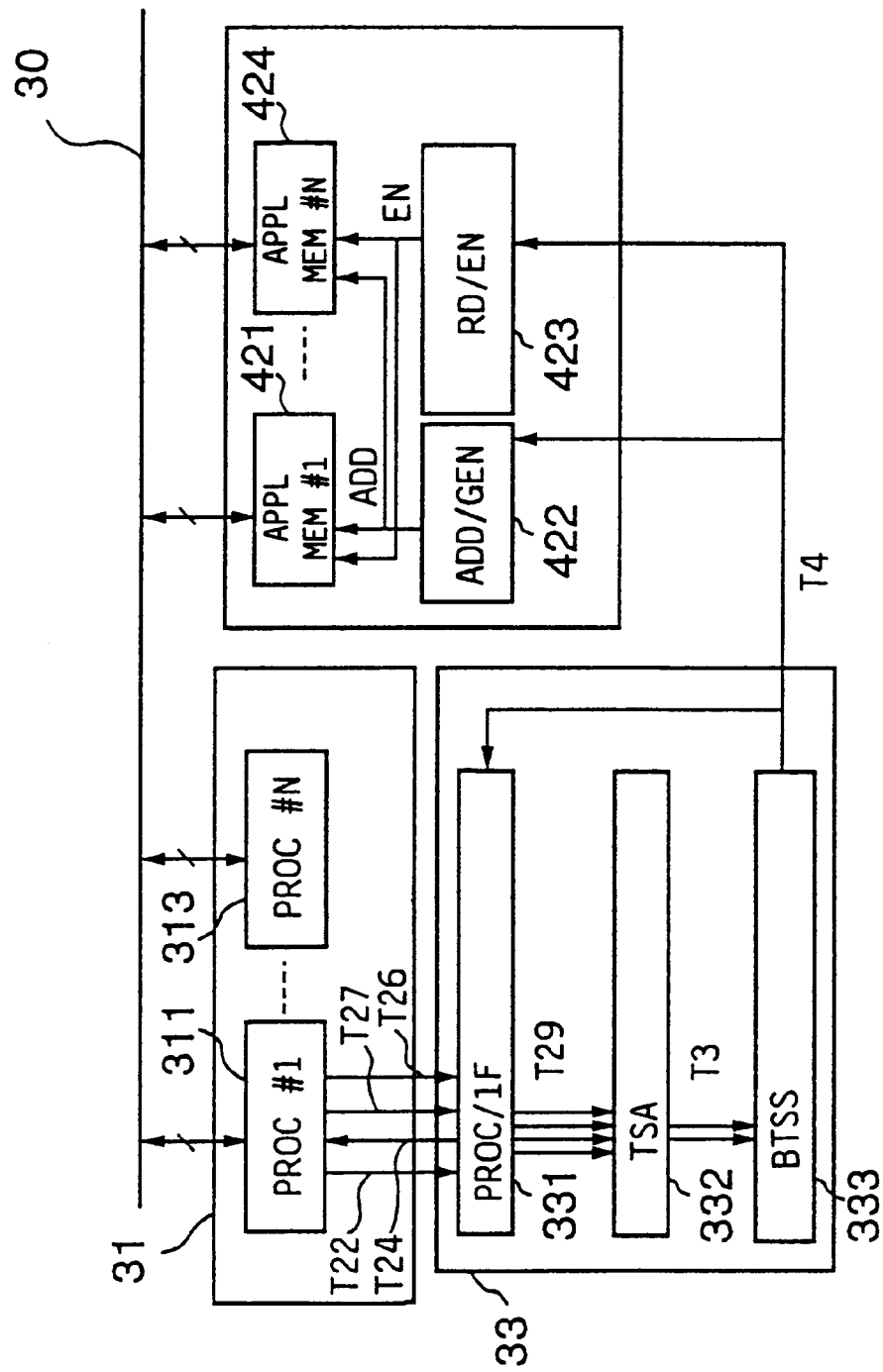
FIG. 35 is a block diagram of a fourteenth embodiment of the multiprocessor control system of the present invention.

FIG. 35 shows a fourteenth embodiment of the multiprocessor control system of the present invention. In FIG. 35, the elements which are essentially the same as corresponding elements in FIG. 11 are designated by the same reference numerals, and a description thereof will be omitted.

In the present embodiment, the boot processor 311 has plural application programs which can be loaded to the boot processor 311 as the boot data. The storage device 42 includes the plurality of memories (APPL MEM#1, APPL MEM#N) 421, 424. Such application programs are stored in the memories 421, 424 of the storage device 42. When sending a boot request to the TSC 33, the boot processor 311 notifies its boot request application type to the TSC 33 (T27). By taking account of the boot-active/inactive status data and the application type of the boot processor 331, the TSA 332 assigns the time slots, produced by the TSD 32, to the "N" processors (T29). When the TSC 33 (or the BTSS 333) notifies a time-slot location to the storage device 42, the RD/EN 423 outputs an enable signal (EN) to a corresponding one of the memories of the storage device 42 that stores the corresponding application program indicated by the application type, in response to the output signal of the BTSS 333. Hence, the boot process for the boot processor 311 is carried out.

FIG. 36 shows a sequence of the multiprocessor control system of FIG. 35. The sequence of FIG. 36 is essentially the same as the sequence of FIG. 34, and a description thereof will be omitted.

Figure 37:
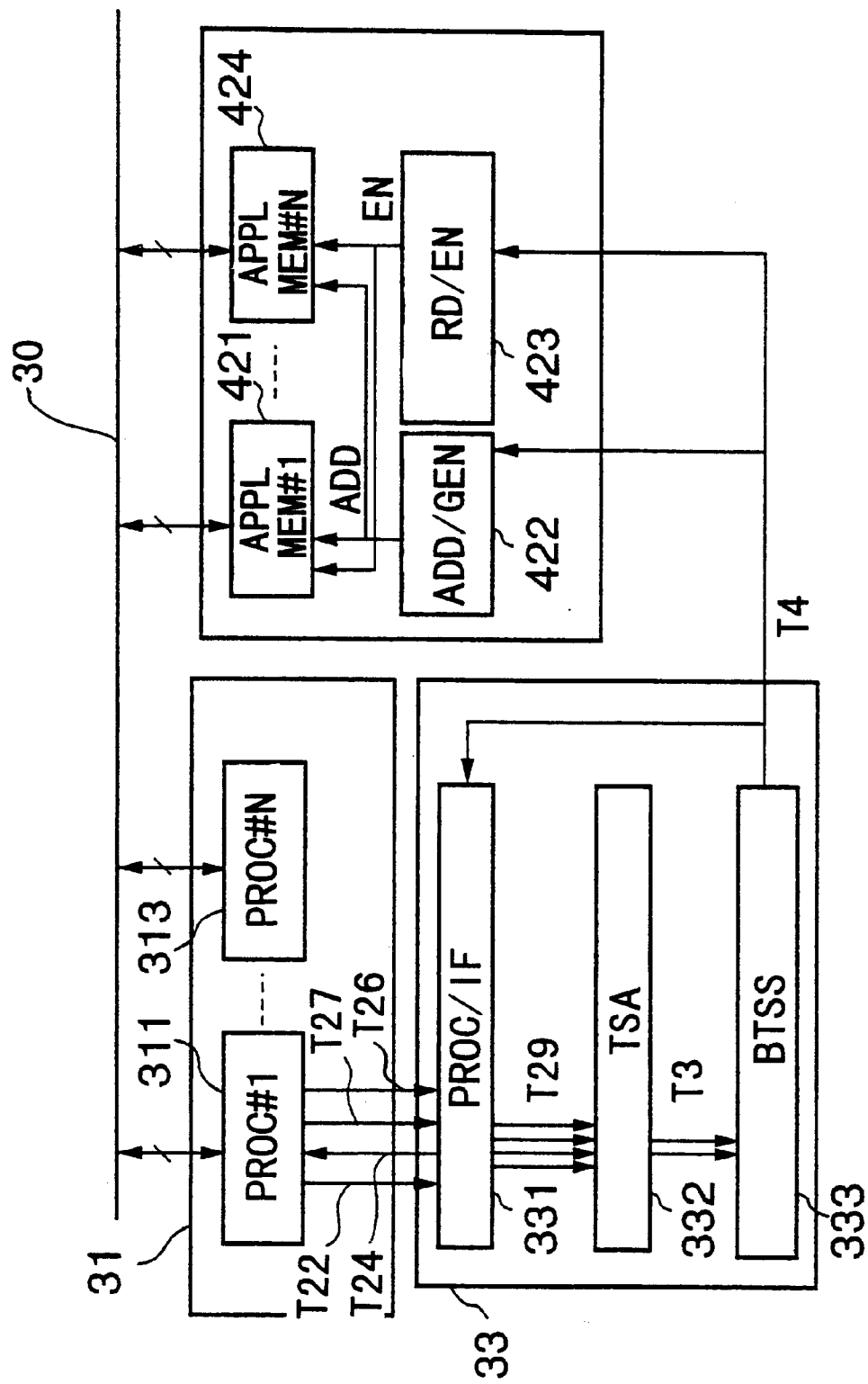
FIG. 37 is a block diagram of a fifteenth embodiment of the multiprocessor control system of the present invention.

FIG. 37 shows a fifteenth embodiment of the multiprocessor control system of the present invention. In FIG. 37, the elements which are essentially the same as corresponding elements in FIG. 11 are designated by the same reference numerals, and a description thereof will be omitted.

In the present embodiment, the boot processor 311 has plural application programs which can be loaded to the boot processor 311 as the boot data, and the boot speeds of the "N" processors are different from each other. The storage device 42 includes the plural memories (APPL MEM#1, APPL MEM#N) 421, 424. Such application programs are stored in each of the memories 421, 424 of the storage device 42. When sending a boot request to the TSC 33, the boot processor 311 sends a boot request application type to the TSC 33 (T27). Further, the boot processor 331 sends a boot speed to the TSC 33 (T26). By taking account of the boot-active/inactive status data, the boot speed and the application type of the boot processor 331, the TSA 332 assigns the time slots, produced by the TSD 32, to the "N" processors (T29). When the TSC 33 (or the BTSS 333) notifies a time-slot location to the storage device 42, the RD/EN 423 outputs an enable signal (EN) to the memory of the storage device 42 that stores the corresponding application program therein, in response to the output signal of the BTSS 333. Hence, the boot process for the boot processor 311 is carried out.

Figure 38:
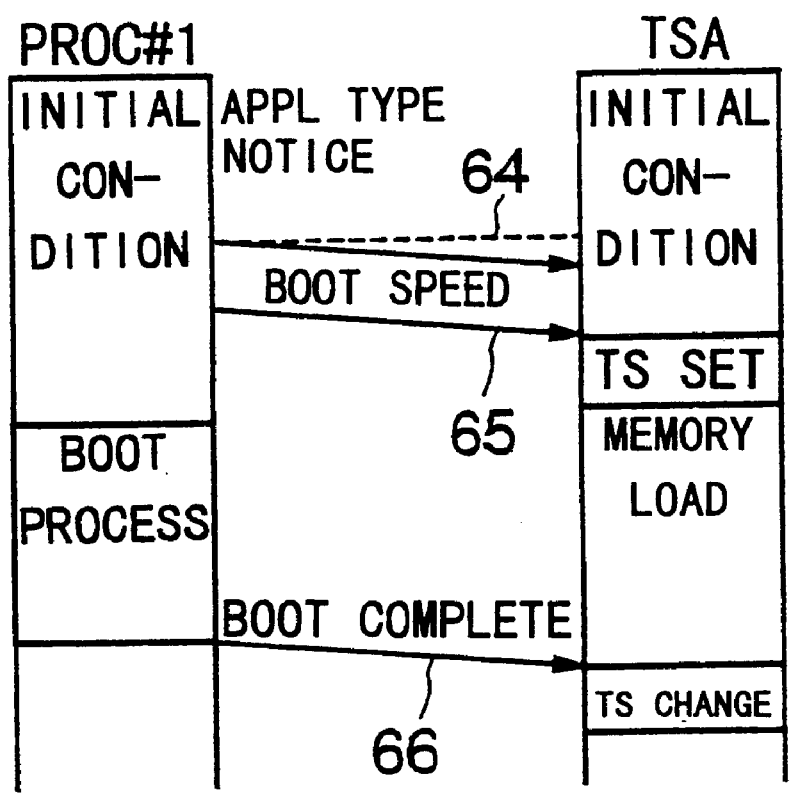
FIG. 38 is a diagram for explaining a sequence of the multiprocessor control system of FIG. 37.

FIG. 38 shows a sequence of the multiprocessor control system of FIG. 37.

As shown in FIG. 38, the boot processor 331 sends a boot request application type to the TSC 33 together with a boot request (64). Further, the boot processor 331 sends a boot speed to the TSC 33 (65). The TSC 33 receives the application type, the boot speed and the boot request from the boot processor 331, and determines a time slot for the boot processor 331 among the time slots produced by the TSD 32, so that a boot process for the boot processor 331 is carried out. After the boot process is terminated, the boot processor 311 notifies the TSC 33 of the boot completion (66).

Figure 39:
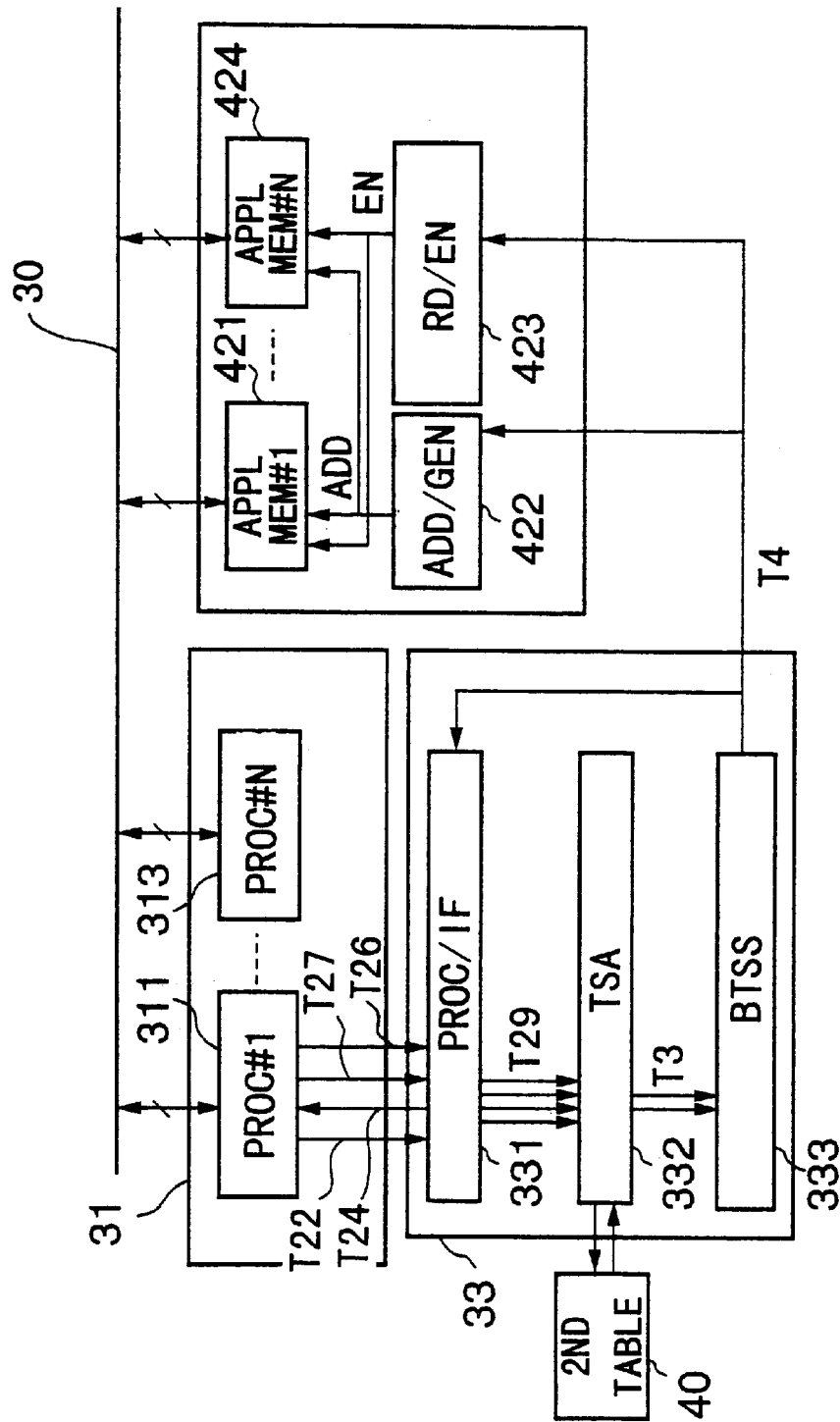
FIG. 39 is a block diagram of a sixteenth embodiment of the multiprocessor control system of the present invention.

FIG. 39 shows a sixteenth embodiment of the multiprocessor control system of the present invention. In FIG. 39, the elements which are essentially the same as corresponding elements in FIG. 11 are designated by the same reference numerals, and a description thereof will be omitted.

In the present embodiment, the boot processor 311 has plural application programs which can be loaded to the boot processor 311 as the boot data, and the boot speeds of the "N" processors are different from each other. The storage device 42 includes the plural memories (APPL MEM#1, APPL MEM#N) 421, 424. Such application programs are stored in each of the memories 421, 424 of the storage device 42. When sending a boot request to the TSC 33, the boot processor 311 sends a boot request application type to the TSC 33 (T27). Further, the boot processor 331 sends a boot speed to the TSC 33 (T26). The TSA 332 reads the predetermined boot-active/inactive status data of the boot processor 331 from the second table 40. By taking account of the boot-active/inactive status data, the boot speed and the application type of the boot processor 331, the TSA 332 assigns the time slots, produced by the TSD 32, to the "N" processors (T29). When the TSC 33 (or the BTSS 333) notifies a time-slot location to the storage device 42, the RD/EN 423 outputs an enable signal (EN) to the memory of the storage device 42 that stores the corresponding application program therein, in response to the output signal of the BTSS 333. Hence, the boot process for the boot processor 311 is carried out.

Figure 40:
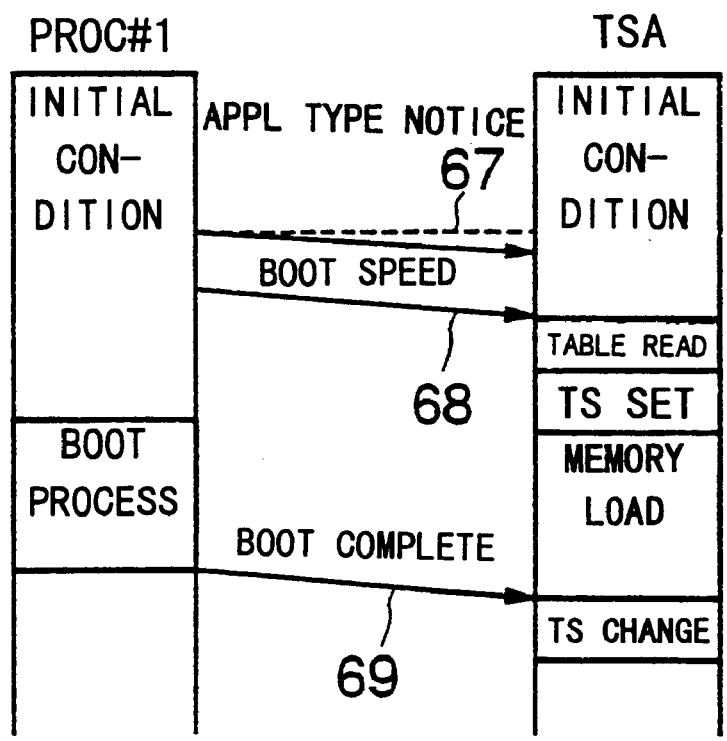
FIG. 40 is a diagram for explaining a sequence of the multiprocessor control system of FIG. 39.

FIG. 40 shows a sequence of the multiprocessor control system of FIG. 39. The sequence of FIG. 40 is essentially the same as the sequence of FIG. 38, and a description thereof will be omitted.

Figure 41:
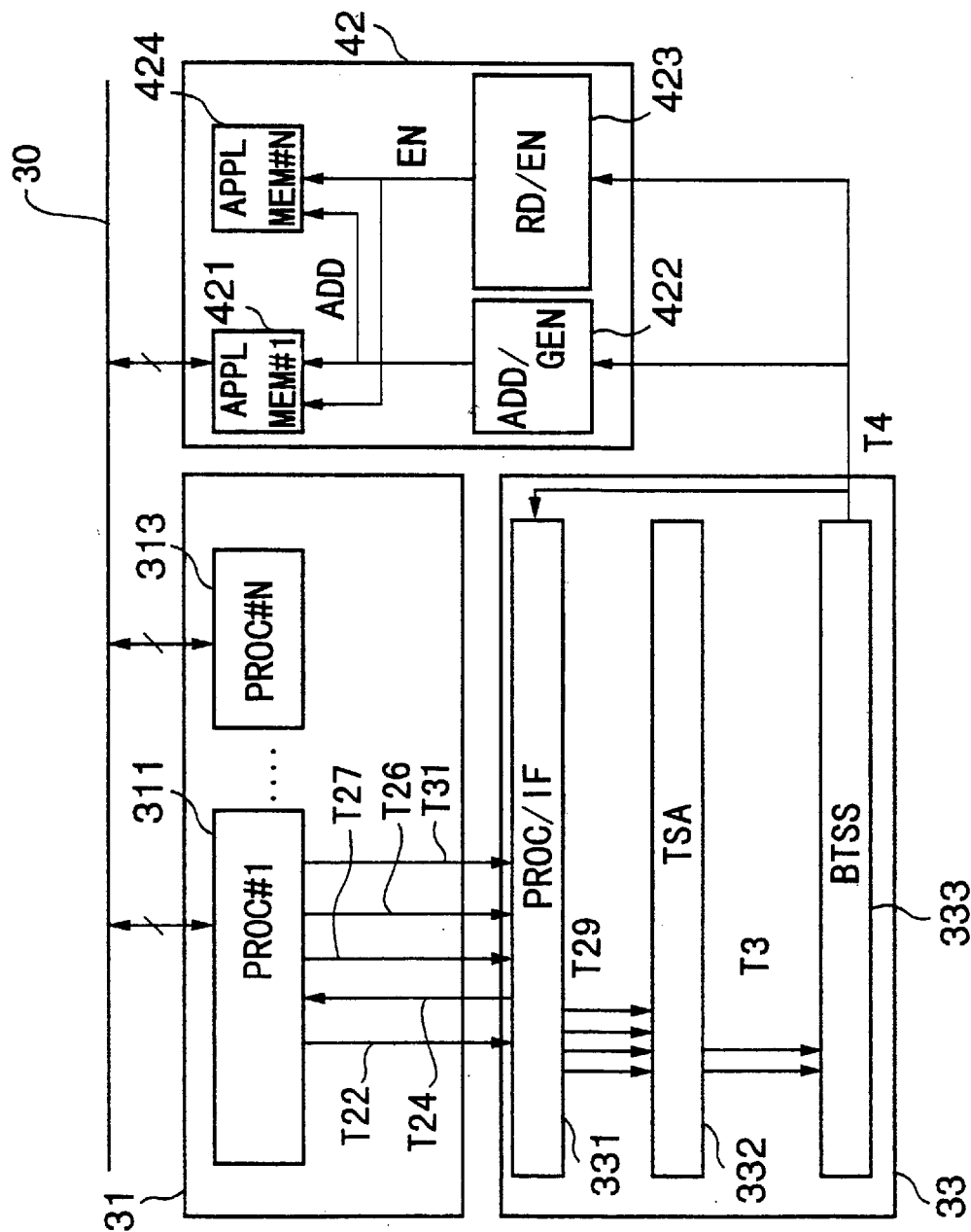
FIG. 41 is a block diagram of a seventeenth embodiment of the multiprocessor control system of the present invention.

FIG. 41 shows a seventeenth embodiment of the multiprocessor control system of the present invention. In FIG. 41, the elements which are essentially the same as corresponding elements in FIG. 11 are designated by the same reference numerals, and a description thereof will be omitted.

In the present embodiment, the multiprocessor control system performs an error process. When the boot process for the boot processor 311 is being executed in the multiprocessor control system (which may be one of the first through sixteenth embodiments described above), there is a possibility that the boot processor 311 detects a data error. When a data error is detected by the boot processor 311 during the boot process, the boot processor 311 notifies the data error to the TSC 33 (T31). When the data error notification from the boot processor 311 is received, the TSC 33 transmits an initialize signal (or a reset signal) to the boot processor 311. The boot process that was in the course of execution is stopped by the initialize signal, and the boot process for the boot processor 311 is restarted.

Figure 42:
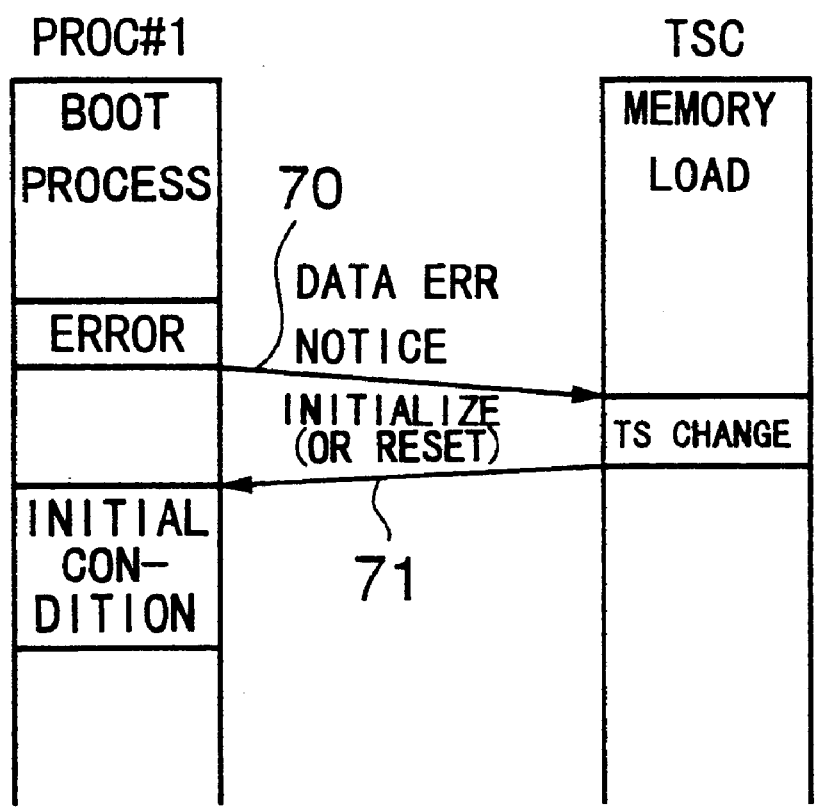
FIG. 42 is a diagram for explaining a sequence of the multiprocessor control system of FIG. 41.

FIG. 42 shows a sequence of the multiprocessor control system of FIG. 41.

As shown in FIG. 42, when a data error occurs during the boot process, the boot processor 331 notifies the data error to the TSC 33 (70). When the data error notification from the boot processor 311 is received, the TSC 33 transmits an initialize signal (or a reset signal) to the boot processor 311 (71). The boot process that was in the course of execution is stopped by the initialize signal. The boot processor 311 is initialized, and then the boot process for the boot processor 311 is restarted when needed.

Figure 43:
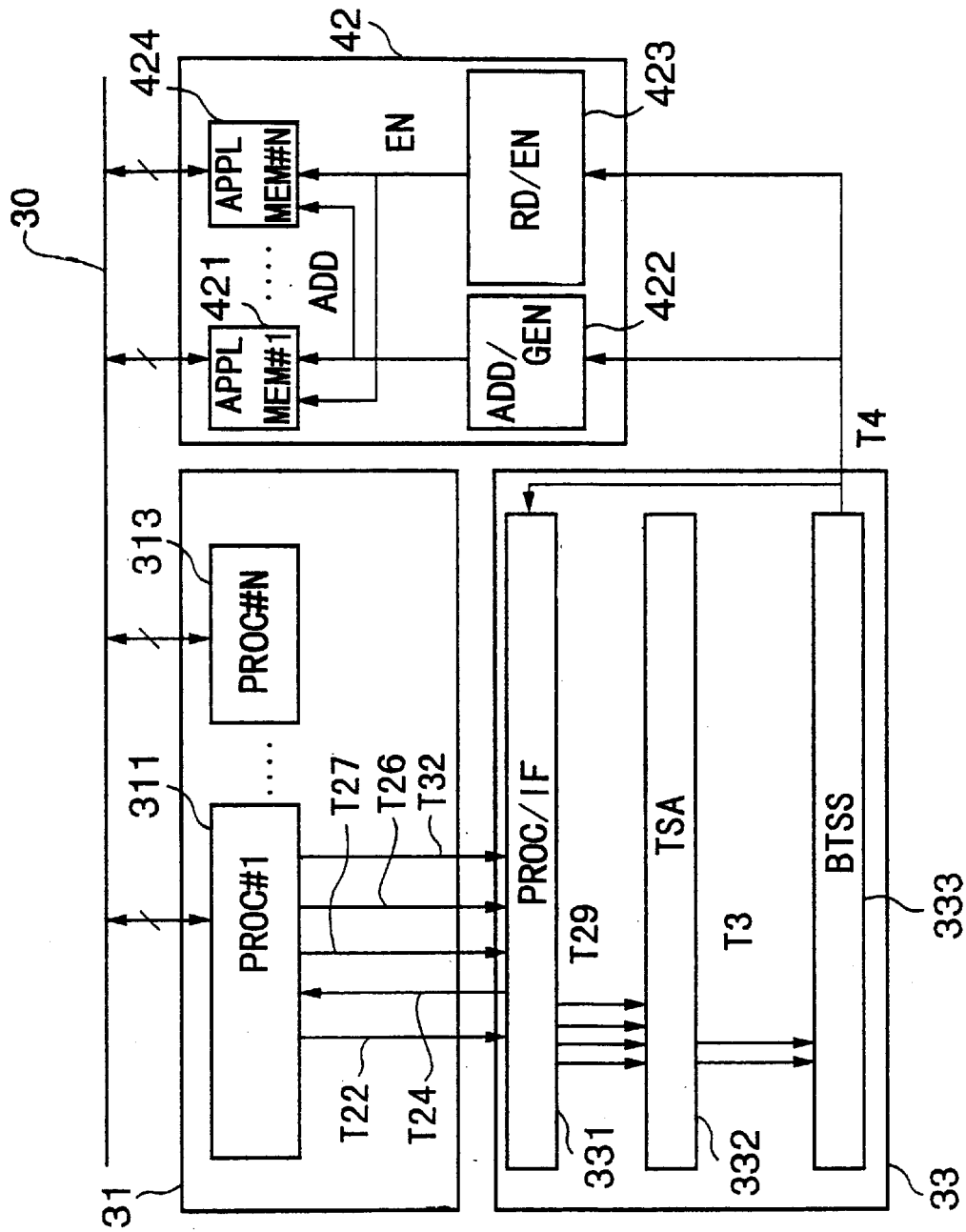
FIG. 43 is a block diagram of an eighteenth embodiment of the multiprocessor control system of the present invention.

FIG. 43 shows an eighteenth embodiment of the multiprocessor control system of the present invention. In FIG. 43, the elements which are essentially the same as corresponding elements in FIG. 41 are designated by the same reference numerals, and a description thereof will be omitted.

In the present embodiment, the multiprocessor control system which is essentially the same as that of FIG. 41 performs the boot process for the boot processor 311 by dividing the boot data into blocks and sequentially loading the blocks of the boot data into the boot processor 311 one by one. The present embodiment is effective for the boot data which is very long. When the blocks of the boot data are sequentially loaded to the boot processor 311 one by one, there is a possibility that the boot processor 311 detects a data error. In the present embodiment, after one block of the boot data is loaded to the boot processor 311, the boot processor 311 sends a block check result to the TSC 33 (T32). When a block check result that indicates a data error is received from the boot processor 311, the TSC 33 transmits an initialize signal (or a reset signal) to the boot processor 311. The boot process that was in the course of execution is stopped by the initialize signal, and the boot process for the boot processor 311 is restarted.

Figure 44:
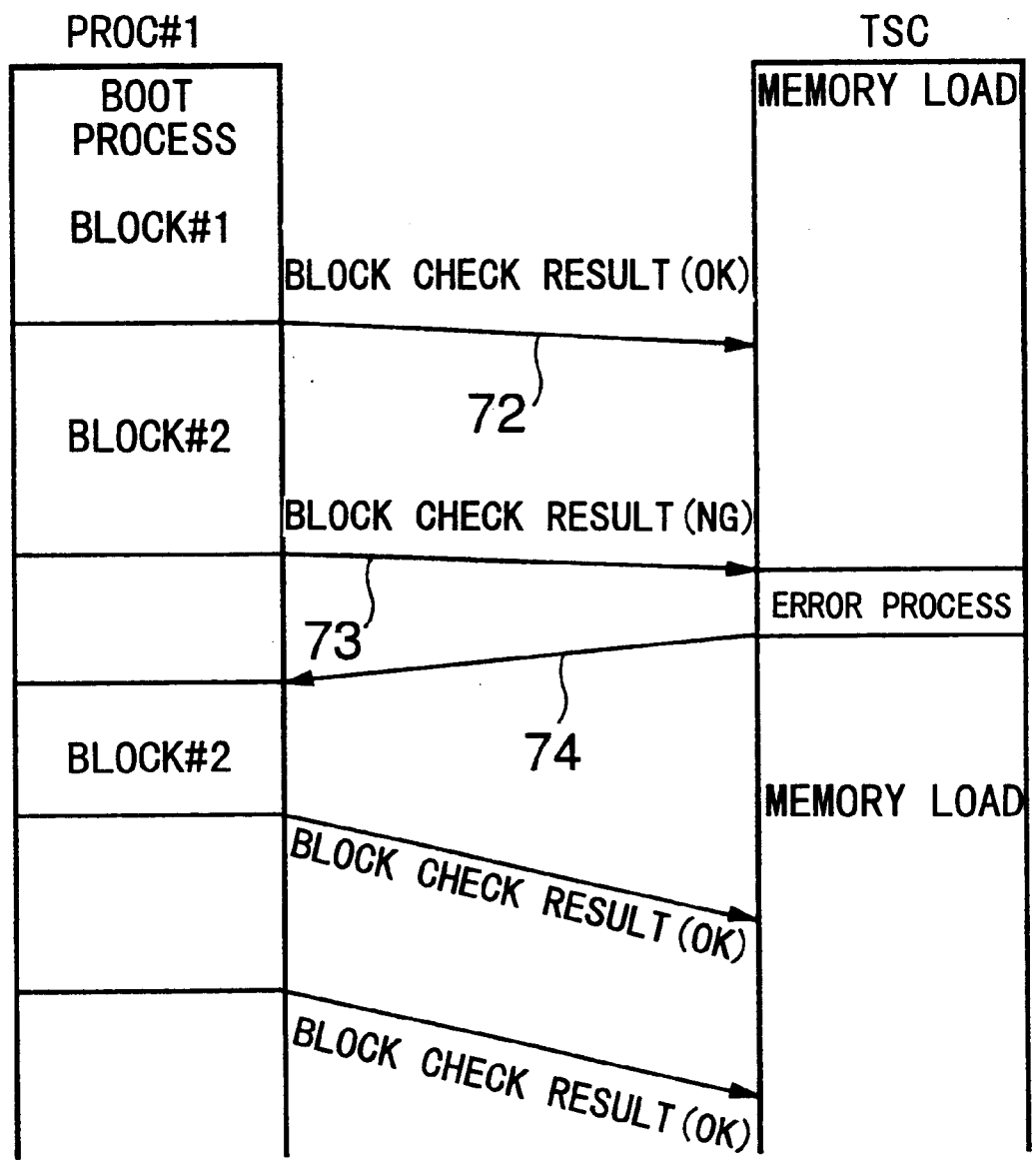
FIG. 44 is a diagram for explaining a sequence of the multiprocessor control system of FIG. 43.

FIG. 44 shows a sequence of the multiprocessor control system of FIG. 43.

As shown in FIG. 44, during the boot process for the boot processor 311, the blocks of the boot data are sequentially loaded to the boot processor 311 one by one. After the first one (block#1) of the blocks of the boot data is loaded to the boot processor 311, the boot processor 311 sends a block check result to the TSC 33 (72). Suppose that this block check result indicates a normal end (OK). After the second block (block#2) of the boot data is loaded to the boot processor 311, the boot processor 311 sends a block check result to the TSC 33 (73). Suppose that this block check result indicates a data error (NG). When the block check result that indicates a data error is received from the boot processor 311, the TSC 33 performs an error process, and transmits an initialize signal (or a reset signal) to the boot processor 311 (74). The boot process that was at the end of the second block loading is stopped by the initialize signal, and the boot process for the boot processor 311 is restarted from the second block (block#2).

Figure 45:
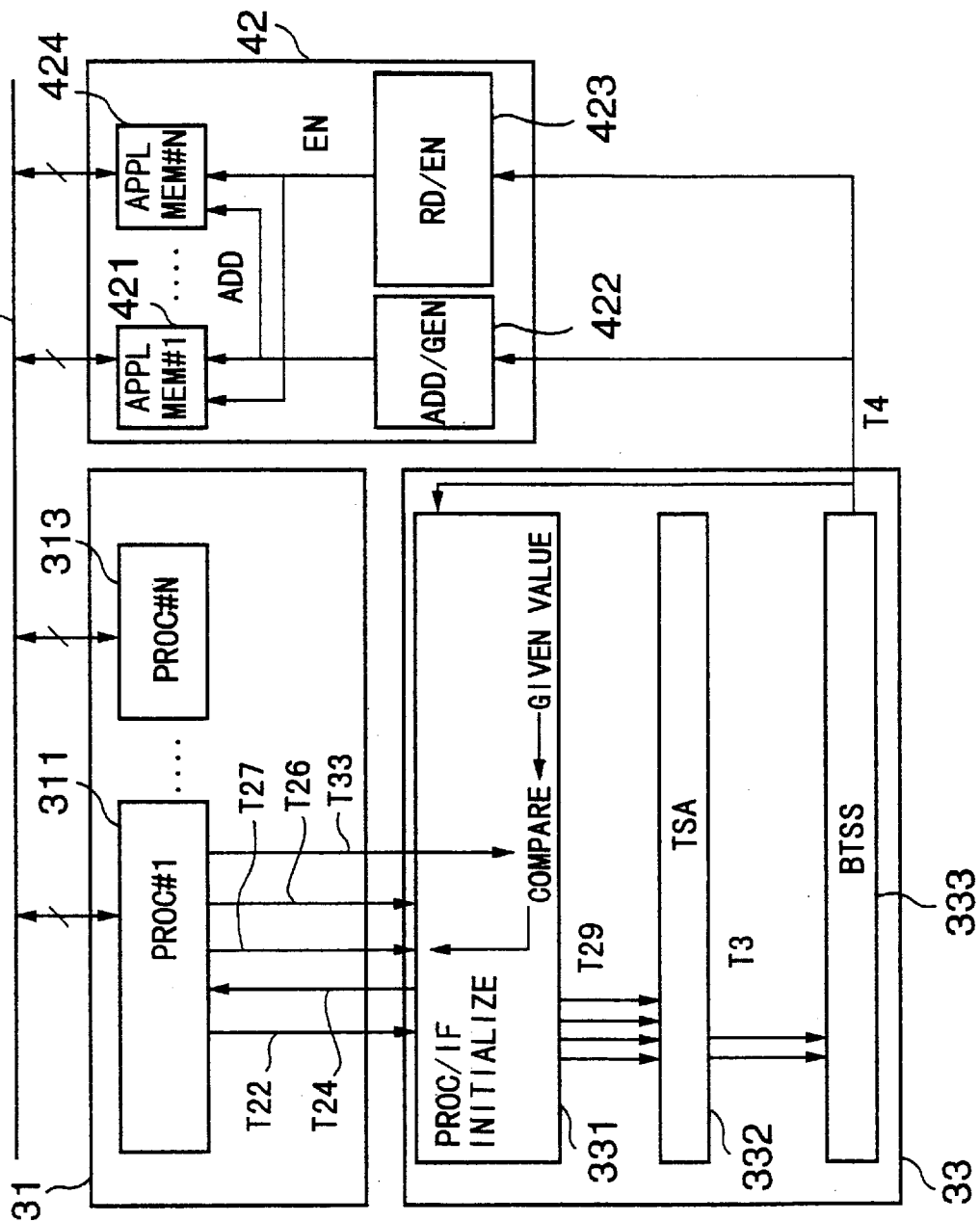
FIG. 45 is a block diagram of a nineteenth embodiment of the multiprocessor control system of the present invention.

FIG. 45 shows a nineteenth embodiment of the multiprocessor control system of the present invention. In FIG. 45, the elements which are essentially the same as corresponding elements in FIG. 43 are designated by the same reference numerals, and a description thereof will be omitted.

In the present embodiment, the multiprocessor control system performs the boot process while the boot processor 311 periodically sends a constant data to the TSC 33 (T33). The TSC 33 receives the constant data from the boot processor 311, and determines whether the boot process for the boot processor 311 is normally performed or abnormally terminated. When an error during the boot process for the boot processor 311 is detected, the TSC 33 transmits an initialize signal (or a reset signal) to the boot processor 311. The boot process for the boot processor 311 is stopped by the initialize signal, and a subsequent boot process for the boot processor 311 is restarted.

Figure 46:
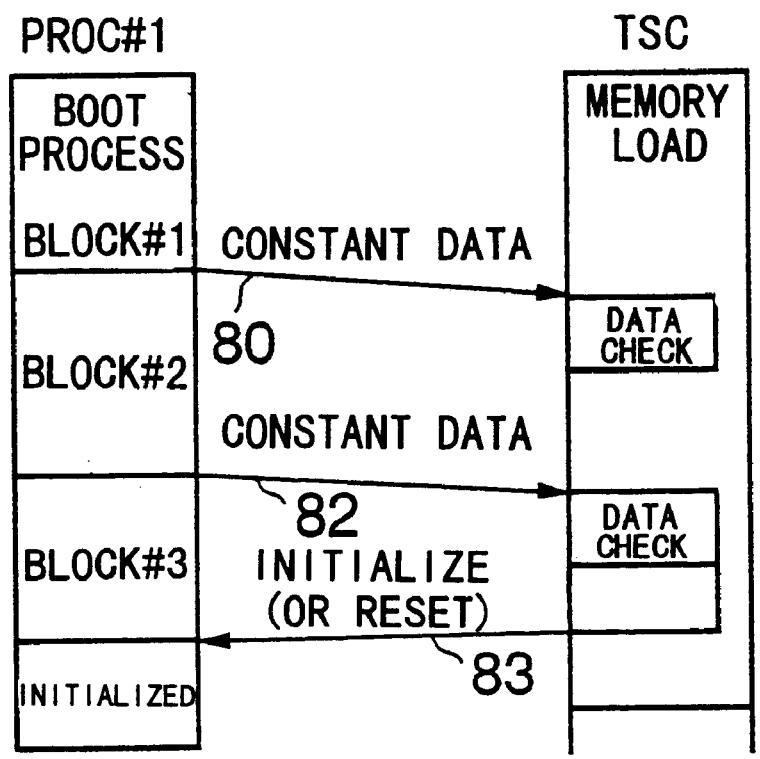
FIG. 46 is a diagram for explaining a sequence of the multiprocessor control system of FIG. 45.

FIG. 46 shows a sequence of the multiprocessor control system of FIG. 45.

As shown in FIG. 46, during the boot process for the boot processor 311, the boot processor 311 periodically sends a constant data to the TSC 33 so that the constant data is written to a given time slot among the time slots produced by the TSD 32 (80, 82). After the constant data is written to the given time slot, the TSC 33 performs a data check and determines whether a data error occurs in the time slot. Suppose that the data check result of the second constant data indicates a data error (NG). When the data error is detected in the time slot, the TSC 33 performs an error process, and transmits an initialize signal (or a reset signal) to the boot processor 311 (83). The boot process that was in the course of execution is stopped by the initialize signal, and the boot process for the boot processor 311 is restarted.

In the embodiments of FIG. 41 through FIG. 46, the multiprocessor control system may be adapted such that, when a data error is detected for the first time during a boot process, the boot process is stopped and restarted, and when the data error is detected again during the restarted boot process, the boot control device 45 transmits a permanent error message related to the channel for the processor of concern, to a host system which manages the boot processor 331. Or, when the data error is detected again during the restarted boot process, the boot control device 45 holds the channel for the processor of concern in an OFF status.

Alternatively, in the embodiments of FIG. 41 through FIG. 46, the multiprocessor control system may be adapted such that, when a data error is detected for the first time during a boot process, the boot process is stopped and restarted, and when the data error is detected again during the restarted boot process, the boot control device 45 withdraws the channel for the processor of concern from the time slot assignment by the TSC 33.

Figure 47:
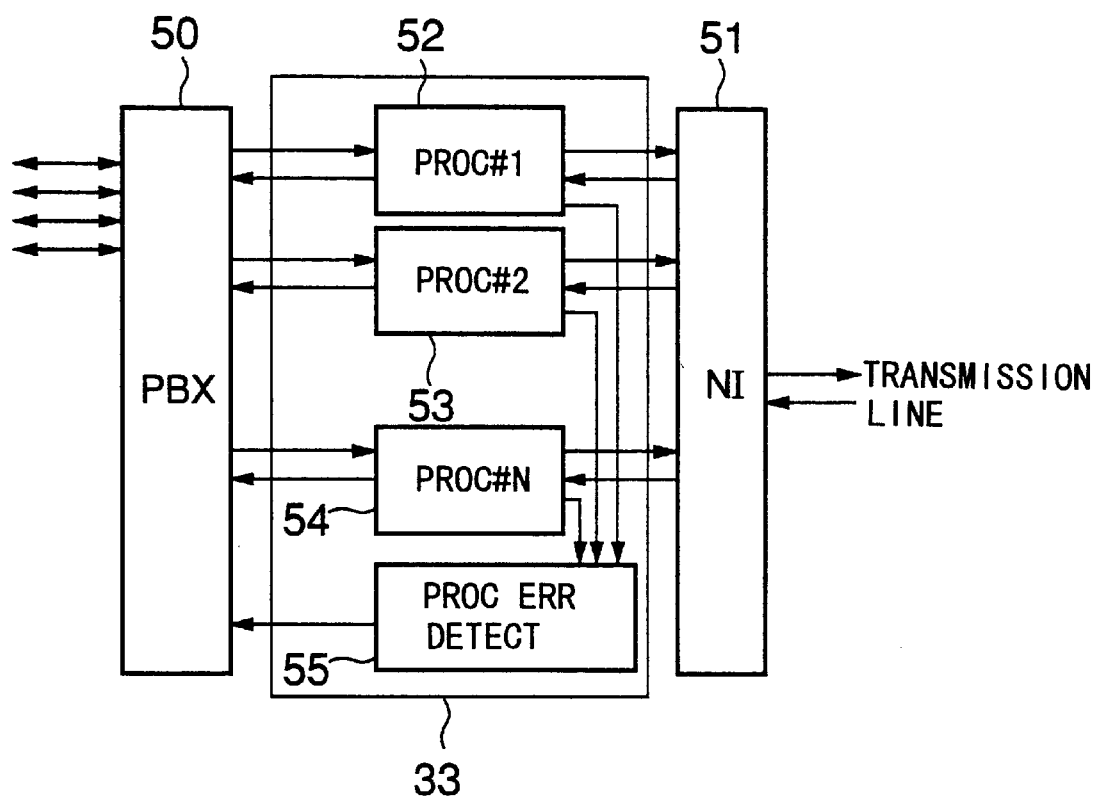
FIG. 47 is a diagram for explaining a twentieth embodiment of the multiprocessor control system of the present invention.

FIG. 47 shows a twentieth embodiment of the multiprocessor control system of the present invention.

In the present embodiment, the "N" processors are a plurality of signal processors 52, 53, 54 provided between a private branch exchange (PBX) 50 and a network interface (NI) 51. The multiprocessor control system, including the TSC 33, is provided between the PBX 50 and the NI 51, and includes the signal processors 52, 53, 54 and a processor error detecting unit 55 which are interconnected. When an error occurs in one of the signal processors 52, 53, 54 during the boot process, the processor error detecting unit 55 detects the error in the signal processor. In such a case, the TSC 33 sets the channel for the processor in an OFF status.

The present invention is not limited to the above-described embodiments, and variations and modifications may be made without departing from the scope of the present invention.

Further, the present invention is based on Japanese priority application No. 10-072,880, filed on Mar. 20, 1998, the entire contents of which are hereby incorporated by reference.

What is claimed is:

1. A multiprocessor control system including a plurality of processors, a boot control device controlling boot of the plurality of processors, a storage device storing boot data, and a shared bus interconnecting the plurality of processors, the boot control device and the storage device, the plurality of processors constituting at least one boot processor to which the boot data is to be loaded, the boot control device including:

a time slot division unit for producing time slots on the shared bus by multiplexing channels for the plurality of processors; and a time sharing control unit for determining a time slot for said at least one boot processor among the time slots produced by the time slot division unit, and for assigning the time slot to said at least one boot processor, the time sharing control unit comprising:

processor interface means for notifying a time-slot location of the time slot determined by the time sharing control unit, to said at least one boot processor; and bus time-slot setting means for notifying the time-slot location to the storage device, the bus time-slot setting means allowing reading of the boot data from the storage device and inserting of the boot data into the time slot at the time-slot location among the time slots on the shared bus, so that the boot data is loaded into said at least one boot processor via the shared bus.

2. The multiprocessor control system according to claim 1, wherein the time sharing control unit notifies a boot start timing to said at least one boot processor by changing a value of a register in said at least one boot processor.

3. The multiprocessor control system according to claim 1, wherein the time sharing control unit notifies a boot start timing to said at least one boot processor by sending an interrupt to said at least one boot processor.

4. The multiprocessor control system according to claim 1, wherein the time sharing control unit notifies a time-slot location of the time slot among the time slots on the shared bus to said at least one boot processor by sending an interrupt to said at least one boot processor.

5. The multiprocessor control system according to claim 1, wherein the time sharing control unit notifies a time-slot number and a time-slot location of the time slot among the time slots on the shared bus to said at least one boot processor by sending an interrupt to said at least one boot processor.

6. The multiprocessor control system according to claim 1, wherein the boot control device includes a processor-status detection unit for detecting processor-status data of the plurality of processors, and the time sharing control unit determines whether executing a boot process for the boot processor is required, based on the processor-status data detected by the processor-status detection unit.

7. The multiprocessor control system according to claim 1, wherein the boot control device includes a first table in which a predetermined boot-active/inactive status of each of the plurality of processors is stored, the time sharing control unit assigning the time slot to said at least one boot processor in accordance with the predetermined boot-active/inactive status of said at least one boot processor read from the first table.

8. The multiprocessor control system according to claim 1, wherein the boot control device includes a second table in which a predetermined boot speed and a predetermined boot-active/inactive status of each of the plurality of processors are stored, the time sharing control unit assigning the time slot to said at least one boot processor in accordance with the predetermined boot speed and the predetermined boot-active/inactive status of said at least one boot processor read from the second table.

9. The multiprocessor control system according to claim 1, wherein the boot control device includes a processor-status detection unit for detecting processor-status data of the plurality of processors by performing polling of the plurality of processors, and the time sharing control unit recognizes a boot request transmitted by one of the plurality of processors based on the processor-status data detected by the processor-status detection unit, the time sharing control unit sending a boot-request response to only said one of the plurality of processors.

10. The multiprocessor control system according to claim 1, wherein each of the plurality of processors notifies a boot speed of the processor to the time sharing control unit when processor-status data of the plurality of processors is detected by the time sharing control unit, the time sharing control unit recognizing a boot speed of said at least one boot processor based on the processor-status data, and assigning the time slot to said at least one boot processor based on the boot speed.

11. The multiprocessor control system according to claim 1, wherein each of the plurality of processors notifies a boot data length of the processor to the time sharing control unit when processor-status data of the plurality of processors is detected by the time sharing control unit, the time sharing control unit recognizing a boot data length of said at least one boot processor based on the processor-status data, and when the time sharing control unit notifies an end time-slot location to the storage device, the storage device outputs a signal, indicating an end of the reading of the boot data, to the time sharing control unit based on the boot data length.

12. The multiprocessor control system according to claim 1, wherein the storage device includes a corresponding number of address counters for the plurality of processors, each of the address counters retaining an address of the boot data for one of the plurality of processors in the storage device, and when the time sharing control unit notifies the time-slot location to the storage device, a corresponding one of the address counters for said at least one boot processor outputs a memory address signal indicating the retained address.

13. The multiprocessor control system according to claim 1, wherein each of the plurality of processors notifies a boot request application type of the processor to the time sharing control unit when processor-status data of the plurality of processors is detected by the time sharing control unit, the time sharing control unit recognizing a boot request application type of said at least one boot processor based on the processor-status data, and assigning the time slot to said at least one boot processor based on the application type.

14. The multiprocessor control system according to claim 13, wherein the storage device includes a plurality of memories which respectively store application programs that can be loaded to said at least one boot processor as the boot data, and when the bus time-slot setting means notifies the time-slot location to the storage device, the bus time-slot setting means allows the storage device to output an enable signal to a corresponding one of the memories that stores an application program indicated by the application type of said at least one boot processor.

15. The multiprocessor control system according to claim 1, wherein a boot process for said at least one boot processor is performed by dividing the boot data into blocks and sequentially loading the blocks of the boot data into said at least one boot processor one by one.

16. The multiprocessor control system according to claim 1, wherein said at least one boot processor detects a data error during a boot process, and when a data error is detected during the boot process, said at least one boot processor notifies the data error to the time sharing control unit, and when the data error notification is received, the time sharing control unit transmits a signal to said at least one boot processor, so that the boot process is stopped by the signal and a complete boot process for said at least one boot processor is restarted.

17. The multiprocessor control system according to claim 1, wherein said at least one boot processor periodically transmits a constant date to the time sharing control unit during a boot process, and the time sharing control unit determines whether the boot process for said at least one boot processor is normally performed, based on the constant data, and when an error during the boot process is detected, the time sharing control unit transmits a signal to said at least one boot processor, so that the boot process is stopped by the signal and a complete boot process for said at least one boot processor is restarted.

18. The multiprocessor control system according to claim 15, wherein, after one block of the boot data is loaded to said at least one boot processor, said at least one boot processor sends a block check result to the time sharing control unit, and when a block check result that indicates a data error is received, the time sharing control unit transmits a signal to said at least one boot processor, so that the boot process is stopped by the signal, and the boot process is restarted from the block at which the data error is detected.

19. The multiprocessor control system according to claim 16, wherein, when the data error is detected again during the restarted boot process, the boot control device holds a channel for said at least one boot processor in an OFF status.

20. The multiprocessor control system according to claim 16, wherein, when the data error is detected again during the restarted boot process, the boot control device transmits a permanent error message related to a channel for said at least one boot processor, to a host system which manages said at least one boot processor.

21. The multiprocessor control system according to claim 16, wherein, when the data error is detected again during the restarted boot process, the boot control device withdraws a channel for said at least one boot processor from the time slot assignment by the time sharing control unit.

22. A boot control device for controlling boot of a plurality of processors connected to a shared bus, the plurality of processors constituting at least one boot processor to which boot data is to be loaded, including:
   a time slot division unit for producing time slots on the shared bus by multiplexing channels for the plurality of processors; and
   a time sharing control unit for determining a time slot for said at least one boot processor among the time slots produced by the time slot division unit, and for assigning the time slot to said at least one boot processor,
   the time sharing control unit comprising:
      processor interface means for notifying a time-slot location of the time slot determined by the time sharing control unit, to said at least one boot processor; and
      bus time-slot setting means for notifying the time-slot location to the storage device, the bus time-slot setting means allowing reading of the boot data from the storage device and inserting of the boot data into the time slot at the time-slot location among the time slots on the shared bus, so that the boot data is loaded into said at least one boot processor via the shared bus.

23. The boot control device according to claim 22, wherein the boot control device includes an interrupt control unit for sending an interrupt to said at least one boot processor, the time sharing control unit notifies a boot start timing and a time-slot location of the time slot to said at least one boot processor when the interrupt is sent to said at least one boot processor by the interrupt control unit.

24. The boot control device according to claim 22, wherein the boot control device includes a processor-status detection unit for detecting processor-status data of the plurality of processors by performing polling of the plurality of processors, and the time sharing control unit recognizes a boot request transmitted by one of the plurality of processors based on the processor-status data detected by the processor-status detection unit, the time sharing control unit sending a boot-request response to only said one of the plurality of processors.

25. The boot control device according to claim 24, wherein the boot control device further includes a polling control unit for transmitting a polling timing signal to the processor-status detection unit, the processor-status detection unit performing the polling of the plurality of processors in accordance with the polling timing signal to detect the processor-status data of the plurality of processors.

26. The boot control device according to claim 22, wherein the boot control device includes a table in which a predetermined boot-active/inactive status of each of the plurality of processors is stored, the time sharing control unit assigning the time slot to said at least one boot processor in accordance with the predetermined boot-active/inactive status of said at least one boot processor read from the table.

27. The boot control device according to claim 24, wherein the boot control device further includes an error detection unit for detecting whether an error occurs in the processor-status data of the plurality of processors detected by the processor-status detection unit.

28. A boot device including a board on which a plurality of processors, a boot control device controlling boot of the processors, a storage device storing boot data, and a shared bus interconnecting the plurality of processors, the boot control device and the storage device, are installed, the plurality of processors constituting at least one boot processor to which the boot data is to be loaded, the boot control device including:
    a time slot division unit for producing time slots on the shared bus by multiplexing channels for the plurality of processors; and
    a time sharing control unit for determining a time slot for said at least one boot processor among the time slots produced by the time slot division unit, and for assigning the time slot to said at least one boot processor,
the time sharing control unit comprising:
    processor interface means for notifying a time-slot location of the time slot determined by the time sharing control unit, to said at least one boot processor; and
    bus time-slot setting means for notifying the time-slot location to the storage device, the bus time-slot setting means allowing reading of the boot data from the storage device and inserting of the boot data into the time slot at the time-slot location among the time slots on the shared bus, so that the boot data is loaded into said at least one boot processor via the shared bus.

29. The boot device according to claim 28, wherein the board includes a plurality of connection terminals provided thereon in place of the plurality of processors, the plurality of processors being provided outside the board and respectively connected through the plurality of connection terminals to the shared bus.

* * * * *